(12) United States Patent
Watanabe et al.

(10) Patent No.: US 12,429,737 B2
(45) Date of Patent: Sep. 30, 2025

(54) LIQUID CRYSTAL DISPLAY DEVICE

(71) Applicant: Sharp Display Technology Corporation, Kameyama (JP)

(72) Inventors: Kouichi Watanabe, Kameyama (JP); Shinichi Terashita, Kameyama (JP); Fumikazu Shimoshikiryoh, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/669,281

(22) Filed: May 20, 2024

(65) Prior Publication Data

US 2024/0427201 A1 Dec. 26, 2024

(30) Foreign Application Priority Data

Jun. 22, 2023 (JP) ................................. 2023-102701

(51) Int. Cl.
| | |
|---|---|
| *G02F 1/1343* | (2006.01) |
| *G02F 1/1333* | (2006.01) |
| *G02F 1/1335* | (2006.01) |
| *G02F 1/13363* | (2006.01) |
| *G02F 1/1337* | (2006.01) |
| *G02F 1/137* | (2006.01) |

(52) U.S. Cl.
CPC ...... *G02F 1/13439* (2013.01); *G02F 1/13338* (2013.01); *G02F 1/133531* (2021.01); *G02F 1/133638* (2021.01); *G02F 1/133769* (2021.01); *G02F 1/134318* (2021.01); *G02F 1/134327* (2013.01); *G02F 1/13706* (2021.01); *G02F 1/13712* (2021.01); *G02F 2201/123* (2013.01)

(58) Field of Classification Search
None
See application file for complete search history.

(56) References Cited

U.S. PATENT DOCUMENTS

| | | | |
|---|---|---|---|
| 6,791,640 B1 * | 9/2004 | Okamoto | .......... G02F 1/133528 349/119 |
| 2014/0125933 A1 | 5/2014 | Tamaki | |
| 2014/0176891 A1 | 6/2014 | Hisada et al. | |
| 2014/0192308 A1 | 7/2014 | Furukawa et al. | |
| 2018/0348553 A1 * | 12/2018 | Koide | ................... G02F 1/1396 |

FOREIGN PATENT DOCUMENTS

| | | |
|---|---|---|
| JP | 5756860 B2 | 7/2015 |
| JP | 5767195 B2 | 8/2015 |

* cited by examiner

*Primary Examiner* — Richard H Kim

(74) *Attorney, Agent, or Firm* — ScienBiziP, P.C.

(57) ABSTRACT

To provide a liquid crystal display device including a plurality of pixels arrayed in a matrix shape that includes a first substrate, a second substrate, and a liquid crystal layer. The first substrate includes a reflective layer, a first electrode and a second electrode capable of generating a transverse electrical field in the liquid crystal layer, and a first horizontal alignment film, at least one of the first electrode and the second electrode includes a plurality of belt-shaped portions and a slit located between two adjacent belt-shaped portions of the plurality of belt-shaped portions, in each pixel, the plurality of belt-shaped portions have a linear shape extending substantially parallel to each other and in the same direction, and do not include a bending part, the second substrate includes a second horizontal alignment film and the liquid crystal layer takes a twist alignment when no voltage is applied.

17 Claims, 42 Drawing Sheets

LIQUID CRYSTAL DISPLAY DEVICE

CROSS-REFERENCE TO RELATED APPLICATIONS

This application claims the benefit of priority to Japanese Patent Application Number 2023-102701 filed on Jun. 22, 2023. The entire contents of the above-identified application are hereby incorporated by reference.

BACKGROUND

Technical Field

The disclosure described below relates to a liquid crystal display device.

Liquid crystal display devices, which utilize a liquid crystal material to function as a display device, are generally classified into transmissive liquid crystal display devices and reflective liquid crystal display devices depending on a display method. The transmissive liquid crystal display devices are devices that perform display in a transmission mode in which transmitted light from backlight on the back face of a screen is used, and the reflective liquid crystal display devices are devices that perform display in a reflection mode in which external light (also referred to as ambient light) instead of the backlight is used. For a display device having such characteristics, a transflective liquid crystal display device has been proposed in which each pixel has a region for performing display in the transmission mode and a region for performing display in the reflection mode (see, for example, JP 5767195 A).

Liquid crystal display devices may be roughly classified according to a liquid crystal driving method, for example, a vertical electrical field mode liquid crystal display device in which a liquid crystal layer is driven by an electrical field in a direction substantially perpendicular to a substrate plane to perform display and a transverse electrical field mode liquid crystal display device in which a liquid crystal layer is driven by an electrical field in a direction substantially parallel to a substrate plane to perform display are known. Examples of the vertical electrical field mode include a Twisted Nematic (TN) mode and a Multi-domain Vertical Alignment (MVA) mode, and examples of the transverse electrical field mode include an In-plane Switching (IPS) mode and a Fringe Field Switching (FFS) mode. For example, JP 5756860 A discloses a liquid crystal display suitable for a transverse electrical field mode liquid crystal display device. Such a liquid crystal display can suppress defects caused by process variations and improve display performance, and is particularly useful as a transmissive liquid crystal display device.

SUMMARY

In recent years, liquid crystal display devices used in smartphones, tablets, and the like are usually provided with a touch sensor function. Various types of touch sensors are known, such as a resistive film type, a capacitive type, and an optical type. A liquid crystal display device provided with a touch sensor (also referred to as a touch panel) is categorized into a type in which the touch sensor is externally attached (external type) and a type in which the touch sensor is built in (built-in type). The built-in type touch panel is more advantageous than the external type touch panel in terms of frame narrowing, thickness in body, light weight, and the like, and also has an advantage in that the light transmittance can be increased.

There are two types of built-in touch panels: on-cell types and in-cell types. The cell means a display panel (also referred to as a liquid crystal panel) including an active matrix substrate represented by a thin film transistor (TFT) substrate, a counter substrate disposed so as to face the substrate, and a liquid crystal layer held between the substrates. In general, in the in-cell type, a layer having a touch sensor function is disposed in the display panel, and in the on-cell type, the layer having a touch sensor function is disposed between the display panel and a polarizer provided on an observation face side of the display panel. In particular, the in-cell type can in principle realize the thinnest and lightest touch panel. A liquid crystal display device capable of performing display in the reflection mode is suitable for outdoor use, and thus, there is a need for in-cell type touch panels capable of performing display in the reflection mode, but such touch panels have not yet been realized.

A reason why such a touch panel has not been realized is thought to be due to the fact that in current reflective liquid crystal display devices, one of a pair of electrodes (also called a counter electrode or a common electrode) for applying a voltage to the liquid crystal layer is placed on the counter substrate side. In view of the above, the present inventors have considered that since both of a pair of electrodes are provided only on an active matrix substrate side for a transverse electrical field mode such as an FFS mode, an in-cell type touch panel capable of performing display in a reflection mode can be realized, and have made intensive studies on a transverse electrical field mode liquid crystal display device.

That is, specifically, a TFT substrate of a mobile model is used, a pixel electrode and a common electrode for applying a voltage to a liquid crystal layer are disposed on a TFT substrate side, the common electrode is used as a slit electrode having a slit-shaped opening, and a negative-working liquid crystal material is further used to prepare an FFS mode device capable of performing display in the reflection mode (see Verification Example 1 described later). In such a device, an alignment disorder occurs due to an influence of an electrical field at a pixel end portion, and therefore, a belt-shaped portion configuring a slit electrode is usually formed in a shape in which a straight line is bent somewhere along the way. When performing an operation in which this device is brought into a white display state, and after black characters are written in the device in such a state, the written characters are erased (that is, the white display state is reestablished), an afterimage of the characters was visually recognized as image sticking (see FIG. 20C). Such an afterimage may also occur during a normal screen operation and a moving picture reproduction. Therefore, such a device has a problem that an afterimage occurs.

The disclosure has been made in view of the above-mentioned current situation, and it is an object thereof to provide a liquid crystal display device capable of sufficiently suppressing occurrence of an afterimage and also useful as an in-cell type touch panel capable of performing display in a reflection mode.

(1) One embodiment of the disclosure is a liquid crystal display device that includes a plurality of pixels arrayed in a matrix shape, the liquid crystal display device including a first substrate, a second substrate facing the first substrate, and a liquid crystal layer provided between the first substrate and the second substrate, in which the first substrate includes a reflective layer that reflects light, a first electrode and a second electrode configured to generate a transverse electrical field in the liquid crystal layer, and a first horizontal alignment film in contact with the liquid crystal layer, at least one of the first electrode and the second electrode includes a plurality of belt-shaped portions and a slit located between two adjacent belt-shaped portions of the plurality of belt-shaped portions, in each pixel of the plurality of pixels, the plurality of belt-shaped portions have a linear shape extending substantially parallel to each other and in the same direction, and do not include a bending part, the second substrate includes a second horizontal alignment film in contact with the liquid crystal layer, and the liquid crystal layer takes a twist alignment when no voltage is applied.

(2) An embodiment of the disclosure is a liquid crystal display device in which, in addition to the configuration of (1) above, the plurality of belt-shaped portions do not include a notched portion.

(3) An embodiment of the disclosure is a liquid crystal display device in which in addition to the configuration of (1) or (2) above, a direction in which the plurality of belt-shaped portions extend is the same direction at least in adjacent pixels or in a display region.

(4) An embodiment of the disclosure is a liquid crystal display device, in which in addition to the configuration of (1), (2), or (3) above, the liquid crystal layer includes a positive-working liquid crystal material.

(5) An embodiment of the disclosure is a liquid crystal display device, in which in addition to the configuration of (1), (2), or (3) above, the liquid crystal layer includes a negative-working liquid crystal material.

(6) An embodiment of the disclosure is a liquid crystal display device, in which in addition to the configuration of (1), (2), (3), (4), or (5) above, a twist angle of the liquid crystal layer when no voltage is applied is 58.3° or greater and 89.9° or less.

(7) An embodiment of the disclosure is a liquid crystal display device, in which in addition to the configurations of (1), (2), (3), (4), (5), or (6) above, the liquid crystal display device provides a single domain alignment.

(8) An embodiment of the disclosure is a liquid crystal display device, in which in addition to the configuration of (1), (2), (3), (4), (5), (6), or (7) above, an alignment direction of liquid crystal molecules on a side of the first substrate when no voltage is applied is −30° or greater and 30° or less when a direction in which the plurality of belt-shaped portions extend is used as a reference 0°).

(9) An embodiment of the disclosure is a liquid crystal display device, in which in addition to the configuration of (1), (2), (3), (4), (5), (6), (7), or (8) above, the plurality of belt-shaped portions have a ratio L/S of a width L per belt-shaped portion in a plan view to a width S per slit in a plan view is 0.4 to 0.7/1.

(10) An embodiment of the disclosure is a liquid crystal display device, in which in addition to the configuration of (1), (2), (3), (4), (5), (6), (7), (8) or (9) above, the liquid crystal device includes a polarizer disposed outside the first substrate and/or the second substrate, and a phase difference layer disposed between the substrate and the polarizer.

(11) An embodiment of the disclosure is a liquid crystal display device, in which in addition to the configuration of (10) above, the liquid crystal layer includes a positive-working liquid crystal material, the polarizer is an absorption-type polarizer, and a light absorption axis of the polarizer is 5° or greater and 35° or less when a direction orthogonal to a direction in which the plurality of belt-shaped portions extend is used as a reference (0°).

(12) An embodiment of the disclosure is a liquid crystal display device, in which in addition to the configuration of (10) or (11) above, the liquid crystal layer includes a positive-working liquid crystal material, the phase difference layer includes a λ/2 plate, and an in-plane slow axis of the λ/2 plate is 25° or greater and 50° or less when a direction orthogonal to a direction in which the plurality of belt-shaped portions extend is used as a reference (0°).

(13) An embodiment of the disclosure is a liquid crystal display device, in which in addition to the configuration of (10), (11), or (12) above, the liquid crystal layer includes a positive-working liquid crystal material, the phase difference layer includes a λ/4 plate, and an in-plane slow axis of the λ/4 plate is 45° or greater and 70° or less when a direction orthogonal to a direction in which the plurality of belt-shaped portions extend is used as a reference (0°).

(14) An embodiment of the disclosure is a liquid crystal display device, in which in addition to the configuration of (10) above, the liquid crystal layer includes a negative-working liquid crystal material, the polarizer is an absorption-type polarizer, and an absorption axis of the polarizer is −85° or greater and −55° or less when a direction orthogonal to a direction in which the plurality of belt-shaped portions extend is used as a reference (0°).

(15) An embodiment of the disclosure is a liquid crystal display device, in which in addition to the configuration of (10) or (14) above, the liquid crystal layer includes a negative-working liquid crystal material, the phase difference layer includes a λ/2 plate, and an in-plane slow axis of the λ/2 plate is −65° or greater and −40° or less when a direction orthogonal to a direction in which the plurality of belt-shaped portions extend is used as a reference (0°).

(16) An embodiment of the disclosure is a liquid crystal display device, in which in addition to the configuration of (10), (14), or (15) above, the liquid crystal layer includes a negative-working liquid crystal material, the phase difference layer includes a λ/4 plate, and an in-plane slow axis of the λ/4 plate is −40° or greater and −15° or less when a direction orthogonal to a direction in which the plurality of belt-shaped portions extend is used as a reference (0°).

(17) An embodiment of the disclosure is a liquid crystal display device, in which in addition to the configuration of (1), (2), (3), (4), (5), (6), (7), (8), (9), (10), (11), (12), (13), (14), (15), or (16) above, display is performed in a normally black mode.

(18) An embodiment of the disclosure is a liquid crystal display device, in which in addition to the configuration of (1), (2), (3), (4), (5), (6), (7), (8), (9), (10), (11), (12), (13), (14), (15), (16) or (17) above, one of the first electrode and the second electrode is a pixel electrode provided in each of the plurality of pixels and the other is a common electrode including a plurality of segments each configured to function as a touch sensor electrode, and the first substrate includes a plurality of touch wiring lines each connected to a corresponding one of the touch sensor electrode.

(19) An embodiment of the disclosure is a liquid crystal display device, in which in addition to the configuration of (1), (2), (3), (4), (5), (6), (7), (8), (9), (10), (11), (12), (13), (14), (15), (16), (17) or (18) above, the liquid crystal display device further includes a light source.

According to the disclosure, it is possible to provide a liquid crystal display device capable of sufficiently suppressing occurrence of an afterimage and also useful as an in-cell type touch panel capable of performing display in a reflection mode.

BRIEF DESCRIPTION OF DRAWINGS

The disclosure will be described with reference to the accompanying drawings, wherein like numbers reference like elements.

DESCRIPTION OF EMBODIMENTS

Definition of Terms

Figure 1:
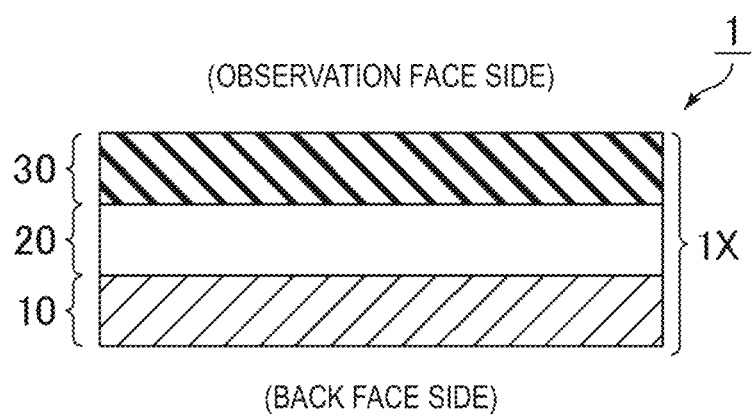
FIG. 1 is a schematic cross-sectional view of a liquid crystal display device 1 according to an example of a first embodiment.

In the present specification, an observation face side means a side closer to a screen (display surface) of a liquid crystal display device, and a back face side means a side farther from the screen (display surface) of the liquid crystal display device.

A voltage non-applied state means a state in which a voltage applied to a liquid crystal layer is less than a threshold voltage (including no voltage application). A voltage applied state means a state in which a voltage applied to the liquid crystal layer is a threshold voltage or higher. In the present specification, the voltage non-applied state is also referred to as "when no voltage is applied", and the voltage applied state is also referred to as "when a voltage is applied".

A polar angle means an angle formed between a subject direction (for example, a measurement direction) and a normal direction of the screen of the liquid crystal panel.

An azimuthal direction means a direction when the subject direction is projected onto the screen of the liquid crystal panel, and is expressed by an angle (azimuth angle) formed between the subject direction and a reference azimuthal direction. Here, the reference azimuthal direction (0°) is set to a horizontal right direction of the screen of the liquid crystal panel.

In the angle and the azimuth angle, a positive angle is counterclockwise from the reference azimuthal direction, and a negative angle is clockwise from the reference azimuthal direction. Counterclockwise and clockwise both represent the rotation direction when the screen of the liquid crystal panel is viewed from the observation face side (front). The angle represents a value measured in a state where the screen of the liquid crystal panel is viewed in a plan view, and means an acute angle unless the rotation direction or the like is specified.

An axial azimuthal direction of the optical film means an azimuthal direction of a polarization axis of a polarizer in a case of the polarizer, and means an azimuthal direction of a slow axis in a case of a phase difference layer. The polarization axis of the polarizer means an absorption axis in a case of an absorption-type polarizer, and means a reflection axis in a case of a reflection-type polarizer. The axial azimuthal direction of the phase difference layer means an azimuthal direction of an in-plane slow axis of the phase difference layer unless otherwise specified.

The phase difference layer means a layer in which at least one of an in-plane retardation (also referred to as an in-plane phase difference) Re and a thickness direction phase retardation (also referred to as a thickness direction phase difference) Rth has a value of 10 nm or greater. Preferably, the phase difference layer has a value of 20 nm or greater. It should be noted that numerical values described herein as Re and Rth are absolute values unless otherwise specified.

The in-plane phase difference Re is defined as $Re=(nx-ny)\times d$.

The thickness direction phase difference Rth is defined as $Rth=\{nz-(nx+ny)/2\}\times d$.

nx represents a principal refractive index in an in-plane slow axis direction of each phase difference layer.

ny represents a principal refractive index in an in-plane fast axis direction of each phase difference layer.

nz represents a principal refractive index in a direction perpendicular to a plane of each phase difference layer.

The slow axis direction is an azimuthal direction in which the refractive index is maximized, and the fast axis direction is an azimuthal direction in which the refractive index is minimized. d represents a thickness of the phase difference layer.

An A plate is a phase difference plate satisfying "$nx>ny\approx nz$".

A measurement wavelength for an optical parameter such as a refractive index and a phase difference is 550 nm unless otherwise specified.

Being substantially parallel means that an angle (absolute value) formed between two lines is within a range of 0°±10°, and such an angle is preferably within a range of 0°±5°, and more preferably 0° (that is, being parallel in a narrow sense is meant). Being substantially orthogonal (or being substantially perpendicular) means that an angle (absolute value) formed between two lines is within a range of 90°±10°, preferably within a range of 90°±5°, and more preferably 90° (that is, being orthogonal or perpendicular in a narrow sense is meant).

A liquid crystal display device according to embodiments of the disclosure will be described below. The disclosure is not limited to the contents described in the following embodiments, and design changes can be made as appropriate within the scope that satisfies the configuration of the disclosure.

First Embodiment

Figure 2:
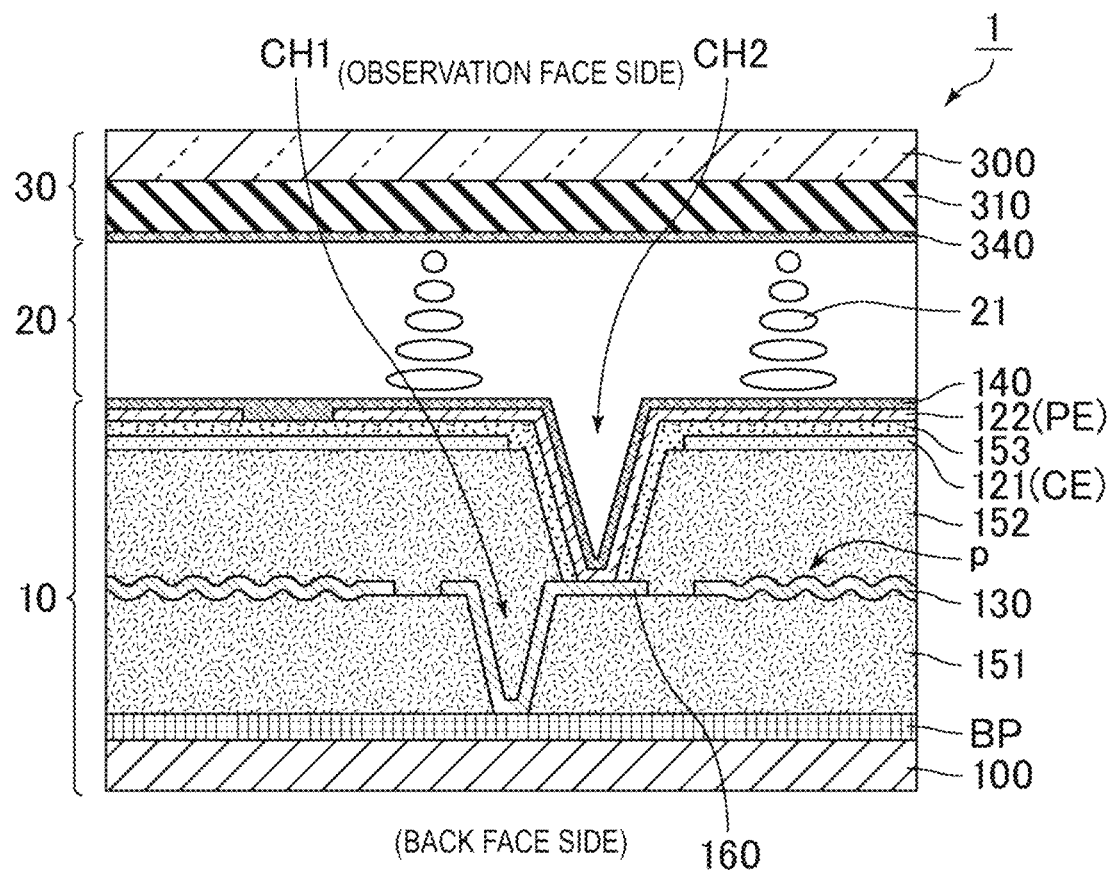
FIG. 2 is a schematic cross-sectional view illustrating more specifically the liquid crystal display device 1 according to an example of the first embodiment.
Figure 3:
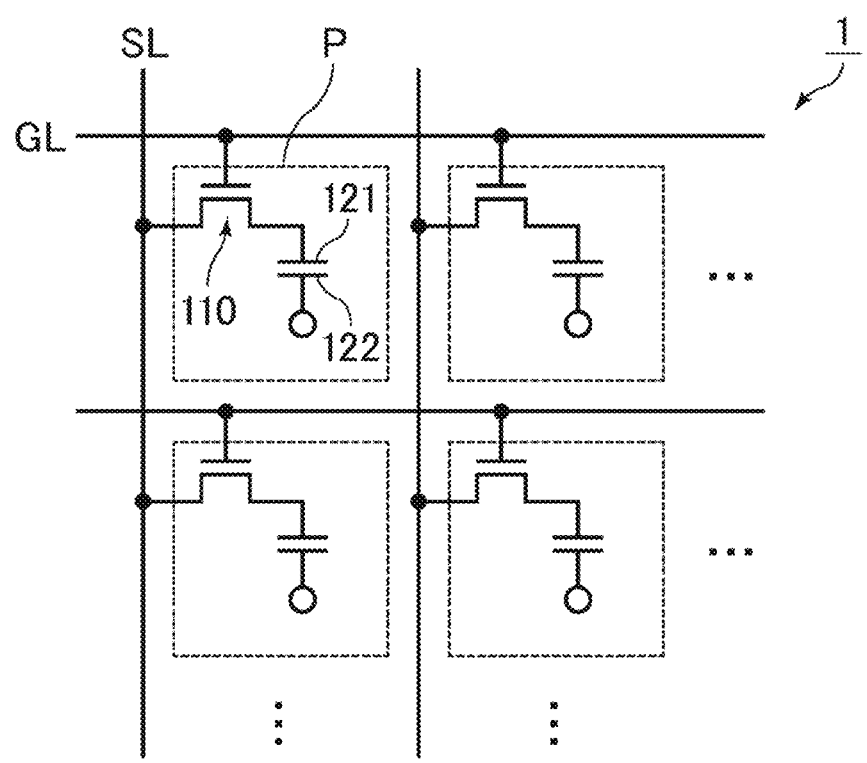
FIG. 3 is a schematic plan view of the entire liquid crystal display device 1 as an example of the first embodiment, as viewed from an observation face side.

FIG. 1 is a schematic cross-sectional view of a liquid crystal display device 1 according to an example of the present embodiment, and FIG. 2 is a schematic cross-sectional view illustrating more specifically the liquid crystal display device 1 according to an example of the present embodiment. FIG. 3 is a schematic plan view obtained when a whole of the liquid crystal display device 1 according to an example of the present embodiment is viewed from an observation face side. As illustrated in FIG. 1, the liquid crystal display device 1 includes a first substrate 10, a liquid crystal layer 20, and a second substrate 30, in order from the back face side. In the present embodiment, a TFT substrate is used as the first substrate 10. Note that a portion or a structural body including a structure in which the liquid crystal layer 20 is interposed between the first substrate 10 and the second substrate 30 is also referred to as a liquid crystal panel 1X.

The liquid crystal display device 1 includes a plurality of pixels P arrayed in a matrix shape, as illustrated in FIG. 3. Although the plurality of pixels P typically include three types of pixels, that is, a red pixel, a green pixel, and a blue pixel, the number of types of pixels may be two or less or four or greater. Each pixel P includes a thin film transistor (TFT) 110 and a first electrode 121 and a second electrode 122 that may generate a transverse electrical field in the liquid crystal layer 20. A gate electrode of the TFT 110 is electrically connected to a corresponding gate wiring line (also referred to as a scanning wiring line) GL, and a source electrode of the TFT 110 is electrically connected to a corresponding source wiring line (also referred to as a signal wiring line) SL. A drain electrode of the TFT 110 is electrically connected to the second electrode 122.

First Substrate

As illustrated in FIG. 2, the first substrate 10 includes a reflective layer 130 that reflects light, the first electrode 121, the second electrode 122, and a first horizontal alignment film 140 in contact with the liquid crystal layer 20 in order from the back face side to the observation face side. It is preferable that the first substrate 10 further include a support substrate 100 and a backplane circuit BP on the back face side of the reflective layer 130. If necessary, an insulating layer (also referred to as an insulating film) is provided between the layers and the like. For example, a first interlayer insulating layer 151 is provided so as to cover the backplane circuit BP, a second interlayer insulating layer 152 is provided on the first interlayer insulating layer 151 with a reflective layer 130 interposed therebetween, and a dielectric layer (also referred to as a third interlayer insulating layer) 153 is provided between the first electrode 121 and the second electrode 122.

The support substrate 100 is preferably transparent and has an insulating property, and examples of the support substrate 100 include a glass substrate and a plastic substrate.

The backplane circuit BP is provided on the support substrate 100. The backplane circuit BP is a circuit for driving the plurality of pixels P, and includes the TFT 110, a gate wiring line GL, and a source wiring line SL. Note that usually, the backplane circuit BP includes a gate insulating film 150G.

The TFT 110 is provided in each of the plurality of pixels P. Each TFT 110 suitably includes an oxide semiconductor layer as an active layer (and is also referred to as an oxide semiconductor TFT). The oxide semiconductor contained in the oxide semiconductor layer has recently attracted attention as an active layer material that may replace amorphous silicon or polycrystalline silicon, and has higher mobility than amorphous silicon. Therefore, the oxide semiconductor TFT is capable of operating faster than amorphous silicon TFT. Further, since the oxide semiconductor layer is formed by a process simpler than that for the polycrystalline silicon layer, the oxide semiconductor layer can be applied to a device that requires a large area.

Since the oxide semiconductor TFT has excellent off-leakage characteristics, a driving method can be used that performs display with a reduced rewriting frequency of an image. For example, when displaying a still image, the oxide semiconductor TFT can be operated so that the image data is rewritten at a frequency of once per second. Such a driving method is called pause driving or low frequency driving, and allows for significant reduction of a power consumption of the liquid crystal display device. By adopting the pause drive and performing touch detection in a period in which rewriting of an image is not performed, it is possible to suppress a decrease in the sensitivity of a touch operation due to noise from the drive circuit and to increase an S/N ratio (signal-to-noise ratio) to approximately 10 times that in the related art, for example.

The oxide semiconductor TFT is also advantageous in reducing a size of the TFT, and thus, a configuration in which a memory circuit is provided for each pixel P (also referred to as MIP (Memory In Pixels)) can be suitably realized.

The oxide semiconductor may be an amorphous oxide semiconductor or a crystalline oxide semiconductor including a crystalline portion. Examples of the crystalline oxide semiconductor include a polycrystalline oxide semiconductor, a microcrystalline oxide semiconductor, or a crystalline oxide semiconductor having a c-axis oriented substantially perpendicular to a layer surface.

The oxide semiconductor layer may be a single layer, or may have a layered structure including two or more layers. The oxide semiconductor layer having a layered structure may include an amorphous oxide semiconductor layer and a crystalline oxide semiconductor layer, may include a plurality of crystalline oxide semiconductor layers with different crystal structures, and may include a plurality of amorphous oxide semiconductor layers. When the oxide semiconductor layer has a dual-layer structure including an upper layer and a lower layer, an energy gap of the oxide semiconductor included in the lower layer and an energy gap of the oxide semiconductor included in the upper layer may be different.

Materials, structures, and film formation methods of an amorphous oxide semiconductor and the above-described crystalline oxide semiconductors, a configuration of an oxide semiconductor layer having a layered structure, and the like are described in, for example, JP 2014-007399 A. The entire contents of the disclosure of JP 2014-007399 A are incorporated herein by reference.

Specifically, the oxide semiconductor layer suitably contains at least one metal element among In (indium), Ga (gallium), and Zn (zinc). In particular, an oxide semiconductor film containing a ternary oxide of In, Ga, and Zn is more preferable. A preferable example of the ternary oxide of In, Ga, and Zn is indium gallium zinc oxide. A semiconductor containing a ternary oxide of In, Ga, and Zn is called an In—Ga—Zn—O-based semiconductor, but in such a semiconductor, a proportion (composition ratio) of In, Ga, and Zn is not particularly limited, and for example, In:Ga:Zn=2:2:1, In:Ga:Zn=1:1:1, In:Ga:Zn=1:1:2, and the like may be adopted.

The In—Ga—Zn—O-based semiconductor may be amorphous or crystalline. In the crystalline In—Ga—Zn—O-based semiconductor, a c-axis is suitably oriented approximately perpendicular to a layer plane.

The crystal structure of the crystalline In—Ga—Zn—O-based semiconductor is disclosed in, for example, JP 2014-007399 A, JP 2012-134475 A, and JP 2014-209727 A. The entire contents of the disclosure of JP 2012-134475 A and JP 2014-209727 A are incorporated herein by reference. The TFT having the In—Ga—Zn—O-based semiconductor layers, which has high mobility (more than 20 times compared to a-Si TFT) and a low leakage current (less than $\frac{1}{100}$ compared to a-Si TFT), is suitably used as a drive TFT (for example, a TFT included in a drive circuit provided around a display region including a plurality of pixels on the same substrate as the display region) and a pixel TFT (TFT provided in a pixel).

The oxide semiconductor layer may include an oxide semiconductor other than the In—Ga—Zn—O-based semiconductor. Examples include a ternary oxide of In, Sn (tin), and Zn, and preferred examples include $In_2O_3$—$SnO_2$—ZnO; InSnZnO. A semiconductor including a ternary oxide of In, Sn, and Zn is referred to as an In—Sn—Zn—O-based semiconductor. Alternatively, the oxide semiconductor layer may include an In—Al—Zn—O based semiconductor, an In—Al—Sn—Zn—O based semiconductor, a Zn—O based semiconductor, an In—Zn—O based semiconductor, a Zn—Ti—O based semiconductor, a Cd—Ge—O based semiconductor, a Cd—Pb—O based semiconductor, CdO (cadmium oxide), a Mg—Zn—O based semiconductor, an In—Ga—Sn—O based semiconductor, an In—Ga—O based semiconductor, a Zr—In—Zn—O based semiconductor, a Hf—In—Zn—O based semiconductor, an Al—Ga—Zn—O based semiconductor, a Ga—Zn—O based semiconductor, and an In—Ga—Zn—Sn—O based semiconductor.

The first interlayer insulating layer 151 is provided so as to cover the backplane circuit BP. A surface of the first interlayer insulating layer 151 on a reflective layer 130 side preferably has an uneven shape (also referred to as an uneven surface structure). Accordingly, the reflective layer 130 is capable of having an uneven surface structure reflecting such an uneven shape. The first interlayer insulating layer 151 having an uneven surface structure may be suitably formed by using a photosensitive resin, for example, as described in JP 3394926 A.

The reflective layer (also referred to as a reflective film) 130 is provided on the first interlayer insulating layer 151. The reflective layer 130 is formed from a material that reflects light. In particular, the reflective layer is preferably formed of a metal material having high reflectivity. Examples of the material of the reflective layer 130 include a silver alloy, and an aluminum alloy.

The reflective layer 130 preferably has an uneven shape reflecting the uneven surface structure preferably provided in the first interlayer insulating layer 151. That is, the reflective layer 130 also suitably has the uneven surface structure. Such an uneven surface structure is also called MRS (Micro Reflective Structure), and is provided to diffusely reflect ambient light and realize a white display close to paper white. The uneven surface structure is preferably configured of a plurality of protruding portions p randomly arranged, for example, such that a center interval between the adjacent protruding portions p is 5 μm or greater and 50 μm or less. The center interval between the adjacent protruding portions p is more preferably 10 μm or greater and 20 μm or less. Suitably, a shape of each protruding portion p is substantially circular or substantially polygonal when viewed from a normal direction of the support substrate. An area of the protruding portion p occupying one pixel P is preferably about 20 to 40%, for example, and a height of the protruding portion p is preferably 1 μm or greater and 5 μm or less, for example.

When the reflective layer 130 is provided and the phase difference layer having a broadband λ/4 condition is introduced, a polarization conversion (for example, conversion between circularly polarized light and linearly polarized light) unique to the reflective liquid crystal display device is enabled, and thus, a light loss is sufficiently reduced. The broadband λ/4 condition is a condition in which polarized light close to circularly polarized light is obtained in a wide range within a visible wavelength.

The second interlayer insulating layer 152 is provided on the first interlayer insulating layer 151 so as to cover the reflective layer 130. That is, between the first interlayer insulating layer 151 and the second interlayer insulating layer 152, the reflective layer 130 is disposed.

Here, the first interlayer insulating layer 151 and the second interlayer insulating layer 152 are preferably formed of an organic insulating material or an inorganic insulating material. Examples of the organic insulating film obtained by using the organic insulating material include an organic film (relative dielectric constant ε=2 to 5) such as acrylic resin, polyimide resin, and novolac resin, and layered bodies thereof. A film thickness of the organic insulating film is not particularly limited, but is 2 μm or greater and 4 μm or less, for example. Examples of the inorganic insulating films obtained by using the inorganic insulating material include an inorganic film (relative dielectric constant ε=5 to 7) such as silicon nitride (SiNx) and silicon oxide (SiO$_2$), and a layered film thereof. A film thickness of the inorganic insulating film is not particularly limited, but is 1500 Å or grater and 3500 Å or less, for example. Alternatively, a layered body of the organic insulating film and the inorganic insulating film may be used. In particular, the first interlayer insulating layer 151 and the second interlayer insulating layer 152 are suitably an organic insulating film.

The first electrode 121 is disposed on the reflective layer 130 via the second interlayer insulating layer 152, and the dielectric layer 153 is disposed between the first electrode 121 and the second electrode 122. Therefore, the reflective layer 130 is located on a side opposite to the liquid crystal layer 20 with respect to the first electrode 121 and the second electrode 122 (that is, on a side closer to the back face side with respect to the first electrode 121 and the second electrode 122). Note that of the first electrode 121 and the second electrode 122, in the present embodiment, the second electrode 122 is located relatively on the observation face side, and the first electrode 121 is located on the back face side. An electrode located relatively on the observation face side is also referred to as an upper layer electrode, and an electrode located relatively on the back face side is also referred to as a lower layer electrode.

One of the first electrode 121 and the second electrode 122 is the pixel electrode PE, and the other is the common electrode CE. A pixel electrode is provided for each of the plurality of pixels P. The pixel electrode is electrically connected to the backplane circuit BP. In the present embodiment, the first electrode 121 (lower layer electrode) is the common electrode CE, and the second electrode 122 (upper layer electrode) is the pixel electrode PE.

At least one of the first electrode 121 and the second electrode 122 includes a plurality of belt-shaped portions SP and a slit Sl located between two adjacent belt-shaped portions of the plurality of belt-shaped portions. Each belt-shaped portion SP corresponds to an electrode portion, and the slit Sl corresponds to an opening portion. Such an electrode is also referred to as a slit electrode or a finger electrode. From the viewpoint of easily generating a transverse electrical field, it is suitable that at least the upper layer electrode (pixel electrode PE in the present embodiment) is a slit electrode. In such a case, the lower layer electrode (common electrode CE in the present embodiment) may be a planar electrode, that is, a so-called solid electrode, or may be a slit electrode.

In each pixel P, the plurality of belt-shaped portions SP configuring the slit electrode (in the present embodiment, the second electrode 122 which is the pixel electrode PE) have a linear shape extending substantially parallel to each other and in the same direction, and do not include a bending part. As a result, the alignment of the liquid crystal molecules is uniform and occurrence of alignment disorder is sufficiently suppressed.

Figure 24A:
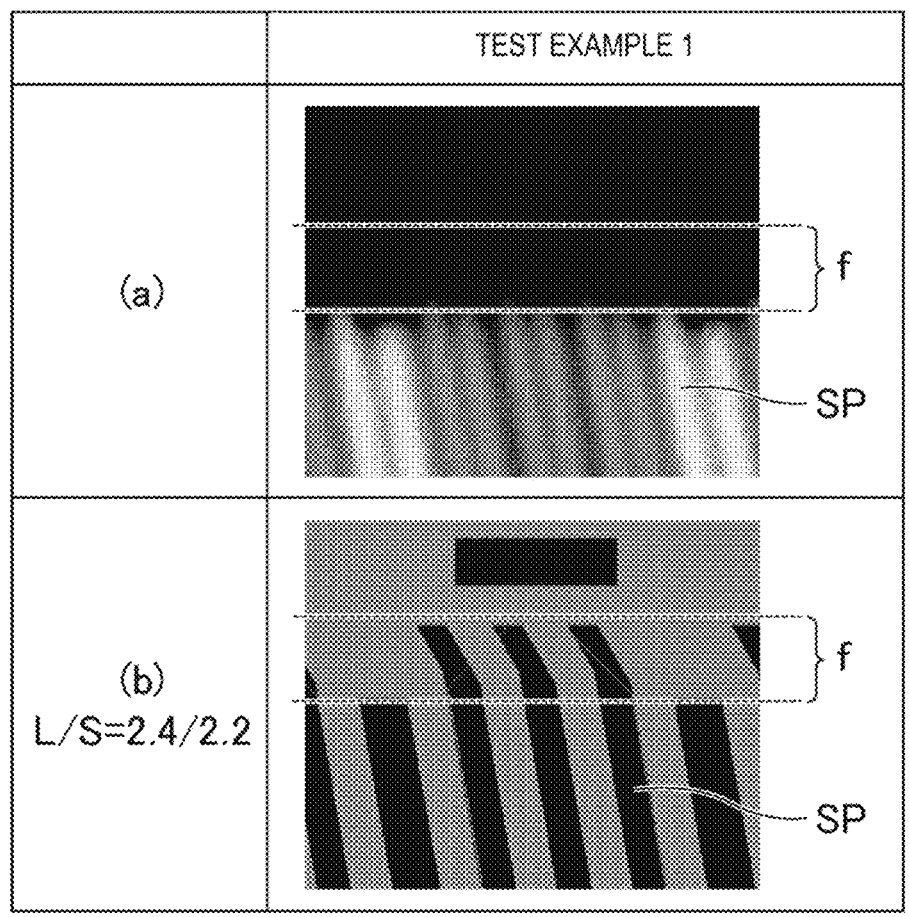
FIG. 24A is a table of a simulation result of Test Example 1 (see (a)) and a diagram conceptually illustrating a plurality of belt-shaped portions SP based on a result thereof (see (b)).
Figure 24B:
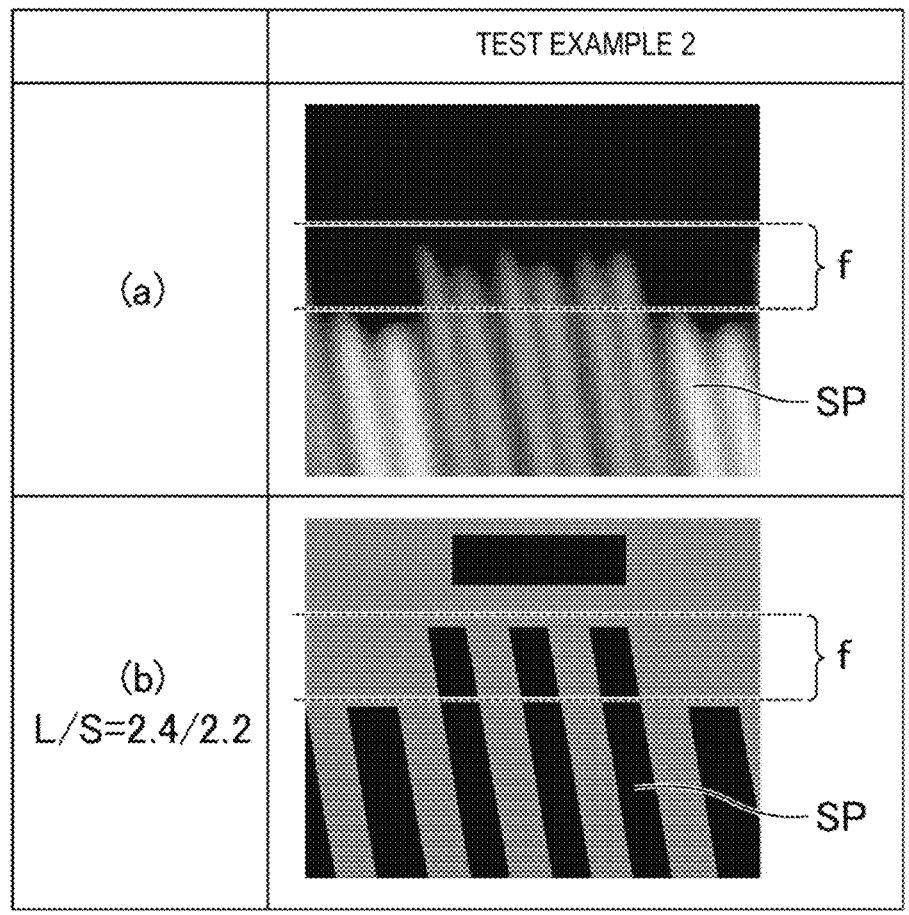
FIG. 24B is a table of a simulation result of Test Example 2 (see (a)) and a diagram conceptually illustrating a plurality of belt-shaped portions SP based on a result thereof (see (b)).

Here, that the plurality of belt-shaped portions SP "have a linear shape and do not include a bending part" means that not an outer edge of the belt-shaped portions SP but a center line of the belt-shaped portions SP has an unbent straight line shape. The center line of the belt-shaped portions SP means a line bisecting the belt-shaped portions SP in a width direction. The width direction means a direction substantially perpendicular to a direction in which the belt-shaped portions SP extend in a plan view. Therefore, even if the outer edge of a tip portion of the belt-shaped portions SP is circular, as long as the center line of the belt-shaped portions SP is an unbent straight line, such a shape is included in the shape "having a linear shape and not including a bending part". For comparison, a shape of the belt-shaped portions SP including the bending part is illustrated in FIG. 24A(b), and a shape of the belt-shaped portions SP not including the bending part is illustrated in FIG. 24B(b).

It is suitable that each belt-shaped portion SP does not include a notched portion. This further suppresses the occurrence of alignment disorder. That "each belt-shaped portion SP does not include a notched portion" means that a part of such a belt-shaped portion SP is not cut out or removed.

In each pixel P, directions in which the plurality of belt-shaped portions SP extend (also referred to as an extending direction of the plurality of belt-shaped portions SP) are substantially parallel to each other. The extending directions of the plurality of belt-shaped portions SP may be different for each pixel, but are preferably the same in two or more adjacent pixels. In particular, it is more preferable that the extending directions of the plurality of belt-shaped portions SP be the same in at least the adjacent pixels from the viewpoint of image quality and manufacturing. FIG. 6A to FIG. 6F described later each illustrate an example in which the extending directions of the plurality of belt-shaped portions SP are the same in the adjacent pixels. It is more suitable that the extending directions of the plurality of belt-shaped portions SP are the same in a display region.

A width L of each belt-shaped portion SP is preferably 0.3 to 10 μm, for example. More preferably, the width L is 1 to 5 μm. An interval between the two belt-shaped portions SP adjacent to each other (that is, an interval between the center lines of each belt-shaped portions) is also preferably 0.3 to 10 μm, for example. More preferably, the interval is 1 to 5 μm.

A ratio L/S (also referred to as an L/S condition) of the width L per belt-shaped portion in a plan view relative to a width S per slit in a plan view is preferably 0.4 to 0.7/1. Accordingly, a reflectivity of the white display (also referred to as white reflectivity) is improved, and thus, a contrast ratio is further improved.

Figure 4A:
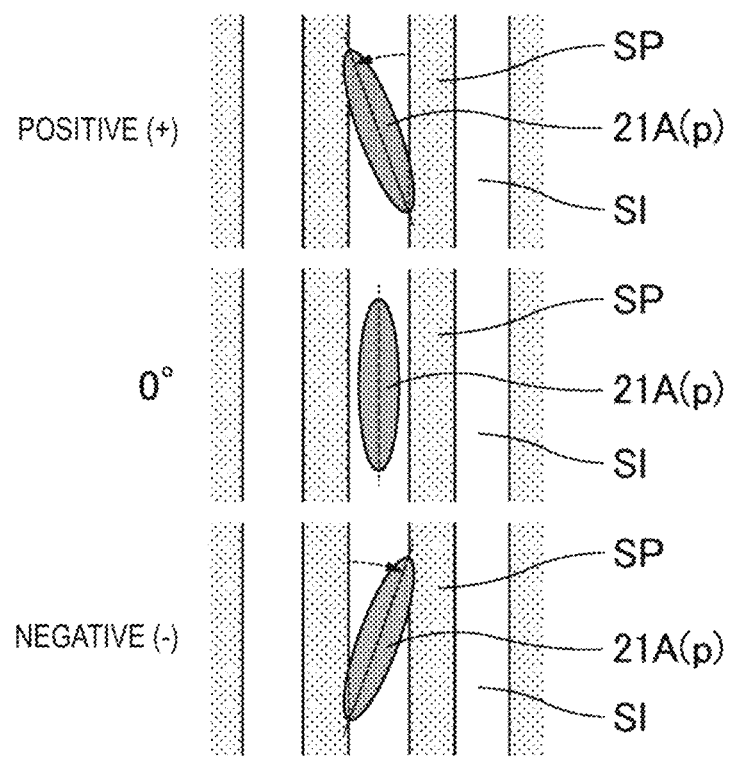
FIG. 4A is a diagram for explaining a slit angle of positive-working liquid crystal molecules.
Figure 4B:
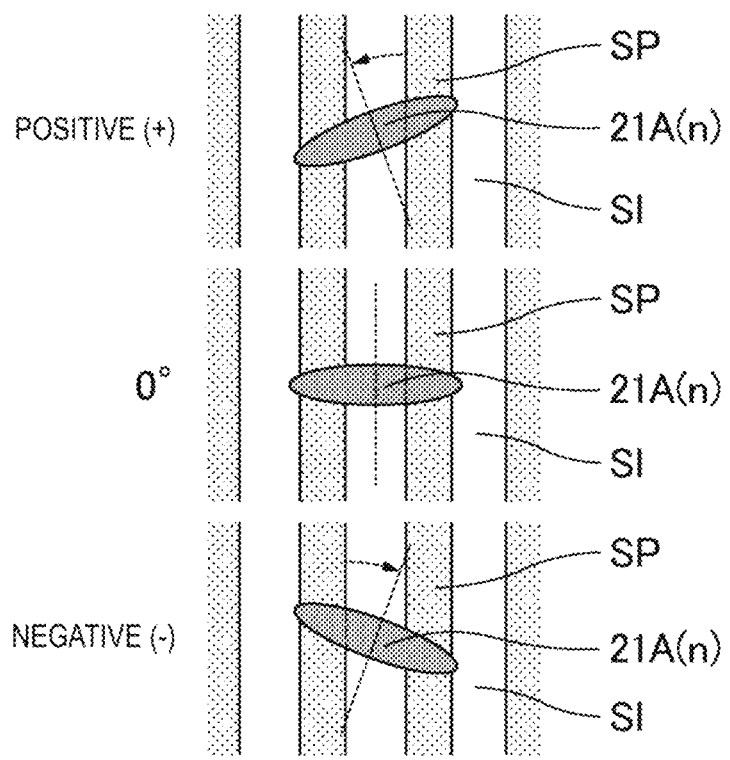
FIG. 4B is a diagram for explaining a slit angle of negative-working liquid crystal molecules.

Here, the alignment direction of the liquid crystal molecules 21 on a first substrate 10 side when no voltage is applied is suitably −30° or greater and 30° or less when the extending direction of the plurality of belt-shaped portions SP is used as a reference (0°). Such an angle, that is, if the extending direction of the plurality of belt-shaped portions SP is used as the reference (0°), and when an angle formed when the extending direction is rotated clockwise is a positive angle (+) and an angle formed when the extending direction is rotated counterclockwise is a negative angle (−), an angle formed by the alignment direction of the liquid crystal molecules 21 on the first substrate 10 side when no voltage is applied is referred to as a slit angle. A definition of the slit angle will be described with reference to FIG. 4A and FIG. 4B. FIG. 4A is a diagram for explaining the slit angle of positive-working liquid crystal molecules, and FIG. 4B is a diagram for explaining the slit angle of negative-working liquid crystal molecules. The liquid crystal molecules 21A mean the liquid crystal molecule 21 in the vicinity of the first horizontal alignment film 140 (that is, the liquid crystal molecules on the first substrate 10 side when no voltage is applied), and (p) appended to a reference numeral of the liquid crystal molecules means positive-working liquid crystal molecules and (n) appended thereto means negative-working liquid crystal molecules, respectively.

In a case of the positive-working liquid crystal molecules, the alignment direction of the liquid crystal molecules 21A on the first substrate 10 side when no voltage is applied corresponds to a long-axis direction of the liquid crystal molecules 21A. When the long-axis direction of the liquid crystal molecules 21A is parallel to the extending direction of the plurality of belt-shaped portions SP, the slit angle is 0° (see a "0°" column in FIG. 4A). If the long-axis direction of such liquid crystal molecules 21A is used as the reference (0°), when the extending direction of the plurality of belt-shaped portions SP is rotated clockwise, the slit angle is the positive angle (+) (see a "positive (+)" column in FIG. 4A). If the long-axis direction of such liquid crystal molecules 21A is used as the reference (0°), when the extending direction of the plurality of belt-shaped portions SP is rotated counterclockwise, the slit angle is the negative angle (−) (see a "negative (−)" column in FIG. 4A).

In a case of the negative-working liquid crystal molecules, the alignment direction of the liquid crystal molecules 21A on the first substrate 10 side when no voltage is applied corresponds to a short-axis direction of the liquid crystal molecules 21A. When the short-axis direction of the liquid crystal molecules 21A is parallel to the extending direction of the plurality of belt-shaped portions SP, the slit angle is 0° (see a "0°" column in FIG. 4B). If the short-axis direction of such liquid crystal molecules 21A is used as the reference (0°), when the extending direction of the plurality of belt-shaped portions SP is rotated clockwise, the slit angle is the positive angle (+) (see a "positive (+)" column in FIG. 4B). If the short-axis direction of such liquid crystal molecules 21A is used as the reference (0°), when the extending direction of the plurality of belt-shaped portions SP is rotated counterclockwise, the slit angle is the negative angle (−) (see a "negative (−)" column in FIG. 4B).

Therefore, it can be said that the slit angle is an angle formed by an axis having a larger absolute value of a dielectric constant, in the liquid crystal molecules 21A on the first substrate 10 side when no voltage is applied, when the extending direction of the plurality of belt-shaped portions is used as a reference (0°).

The suitable range of the slit angle varies depending on a condition of the width L of each belt-shaped portion SP and the width S of each slit Sl (also referred to as an L/S condition), a twist angle, whether the liquid crystal material is a positive-working material or a negative-working material, and the like. In particular, in a monodomain structure, when an optimum slit angle is selected according to the L/S condition, it is possible to maximize the reflectivity (particularly, a white reflectivity).

For example, when the positive-working liquid crystal material is used and the twist angle is 74°, under a condition of L/S (μm)=2.2/4.1 (that is, L/S=0.537/1), the slit angle is preferably in a range of −25° to +18°, more preferably in a range of −18° to +9°, and still more preferably in a range of −11.5° to +2° (see Test Example 3-1 described later). Under a condition of L/S (μm)=1.6/3.0 (that is, L/S=0.533/1), the slit angle is preferably in a range of −18° to +14°, more preferably in a range of −11° to +9°, and still more preferably in a range of −9.5° to 0° (see Test Example 3-2 described later). Under a condition of L/S (μm)=3.0/5.0 (that is, L/S=0.6/1), the slit angle is preferably in a range of −25° to +13°, and more preferably in a range of −13° to +5° (see Test Example 3-3 described later).

For example, when the negative-working liquid crystal material is used and the twist angle is 74°, under a condition of L/S (μm)=2.2/4.1 (that is, L/S=0.537/1), the slit angle is preferably in a range of −30° to +5°, and more preferably in a range of −28° to −3° (see Test Example 4-1 described later). Under a condition of L/S (μm)=1.6/3.0 (that is, L/S=0.533/1), the slit angle is preferably in a range of −25° to +3°, and more preferably in a range of −15° to −7° (see Test Example 4-2 described later). Under a condition of L/S (μm)=3.0/5.0 (that is, L/S=0.6/1), the slit angle is preferably in a range of −30° to 0°, and more preferably in a range of −22° to −10° (see Test Example 4-3 described later).

For example, when the positive-working liquid crystal material is used and the twist angle is 83°, under a condition of L/S (μm)=2.2/4.1 (that is, L/S=0.537/1), the slit angle is preferably in a range of −27° to +16°, more preferably in a range of −18° to +10°, and still more preferably in a range of −11.5° to 0° (see Test Example 5-1 described later). Under a condition of L/S (μm)=1.6/3.0 (that is, L/S=0.533/1), the slit angle is preferably in a range of −20° to +13°, more preferably in a range of −12° to +7°, and still more preferably in a range of −9.5° to 0° (see Test Example 5-2 described later). Under a condition of L/S (μm)=3.0/5.0 (that is, L/S=0.6/1), the slit angle is preferably in a range of −27° to +13°, and more preferably in a range of −18° to +8° (see Test Example 5-3 described later).

For example, when the negative-working liquid crystal material is used and the twist angle is 83°, under a condition of L/S (μm)=2.2/4.1 (that is, L/S=0.537/1), the slit angle is preferably in a range of −30° to +5°, more preferably in a range of −30° to −7°, and still more preferably in a range of −19° to −12° (see Test Example 6-1 described later). Under a condition of L/S (μm)=1.6/3.0 (that is, L/S=0.533/1), the slit angle is preferably in a range of −30° to +3°, and more preferably in a range of −15° to −5° (see Test Example 6-2 described later). Under a condition of L/S (μm)=3.0/5.0 (that is, L/S=0.6/1), the slit angle is preferably in a range of −30° to +2°, and more preferably in a range of −30° to −5° (see Test Example 6-3 described later).

Figure 5:
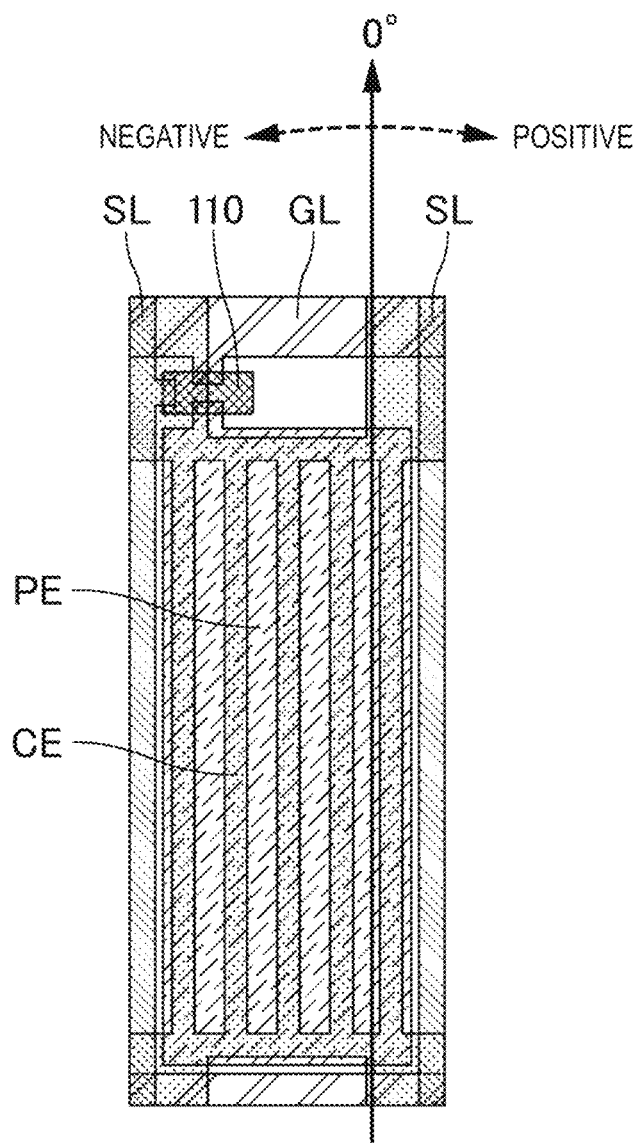
FIG. 5 is a schematic plan view illustrating an example of a structure of a pixel (angle X is 0°).
Figure 6A:
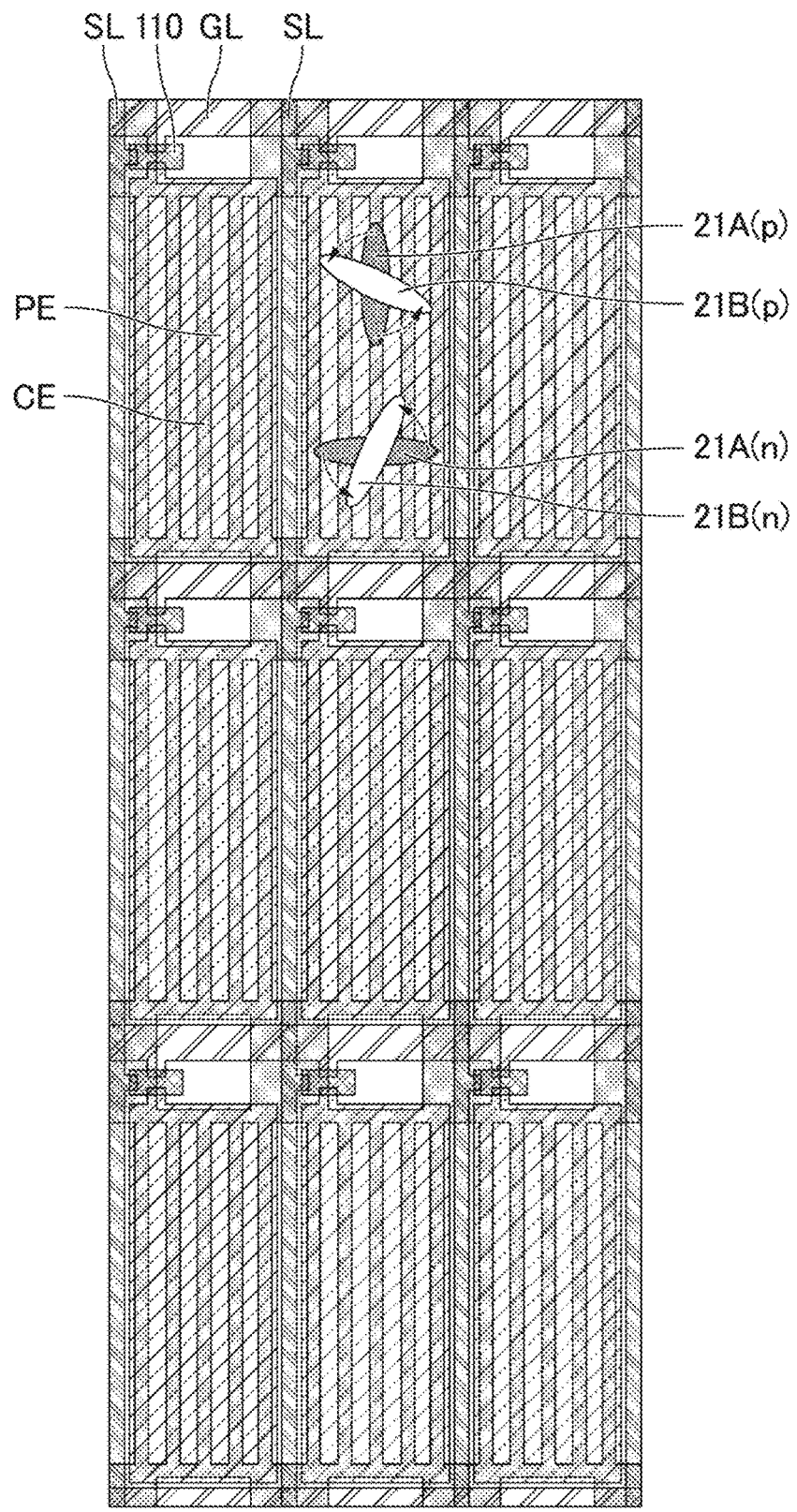
FIG. 6A is a schematic plan view illustrating an example of an arrangement of pixels (angle X is 0°).
Figure 6B:
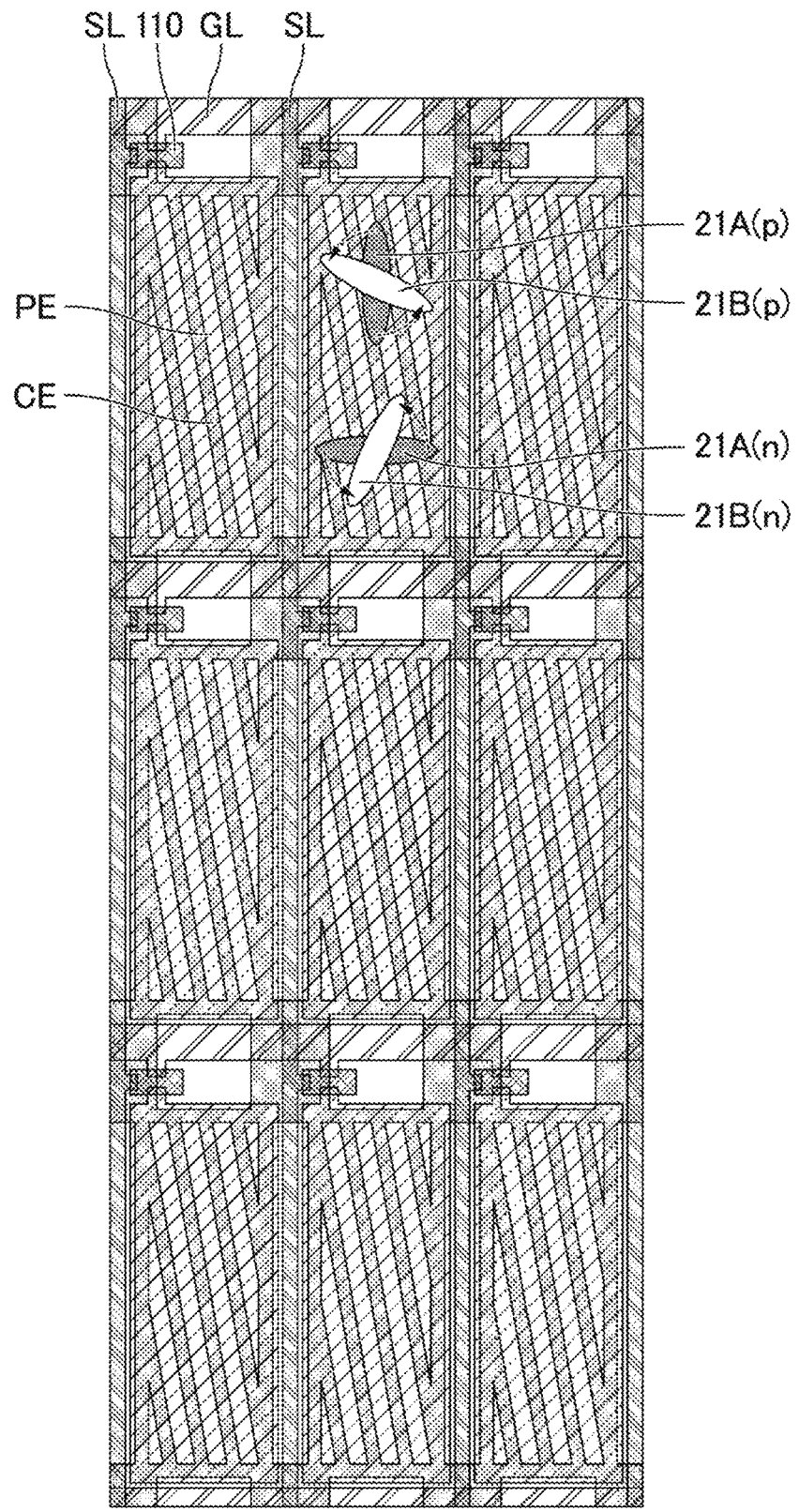
FIG. 6B is a schematic plan view illustrating an example of an arrangement of pixels (angle X is −10°).
Figure 6C:
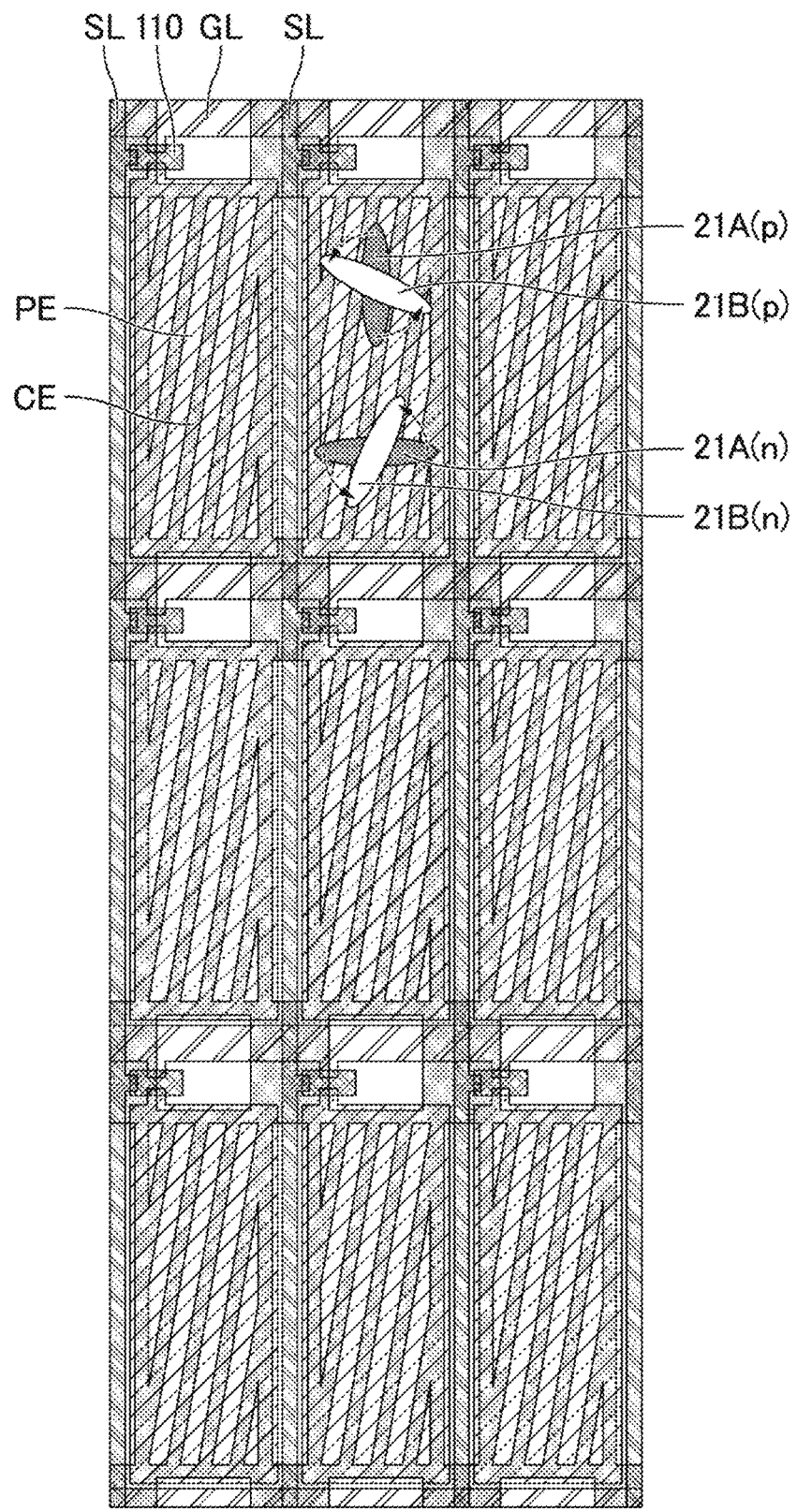
FIG. 6C is a schematic plan view illustrating an example of an arrangement of pixels (angle X is +10°).
Figure 6D:
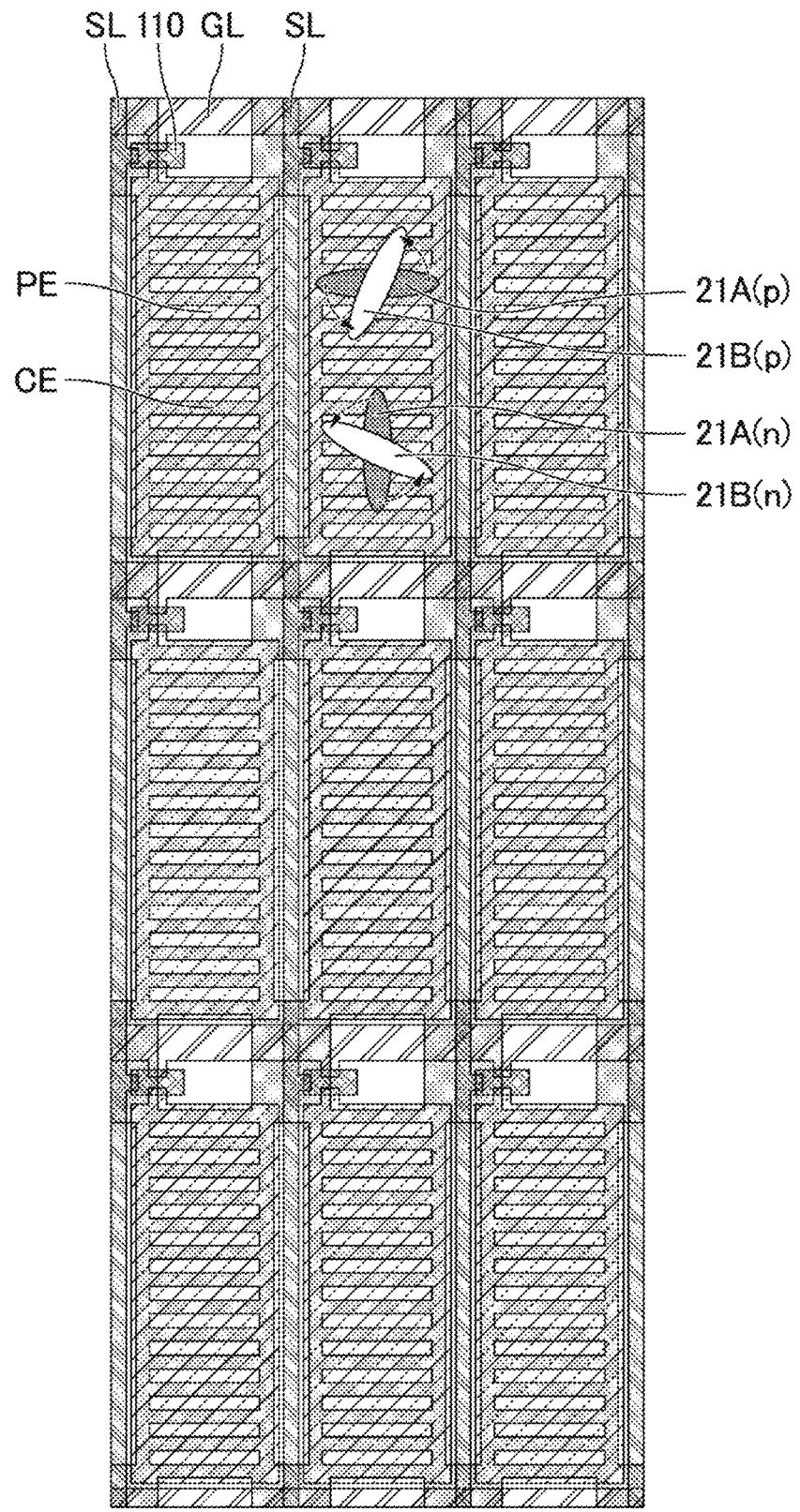
FIG. 6D is a schematic plan view illustrating an example of an arrangement of pixels (angle X is −90°).
Figure 6E:
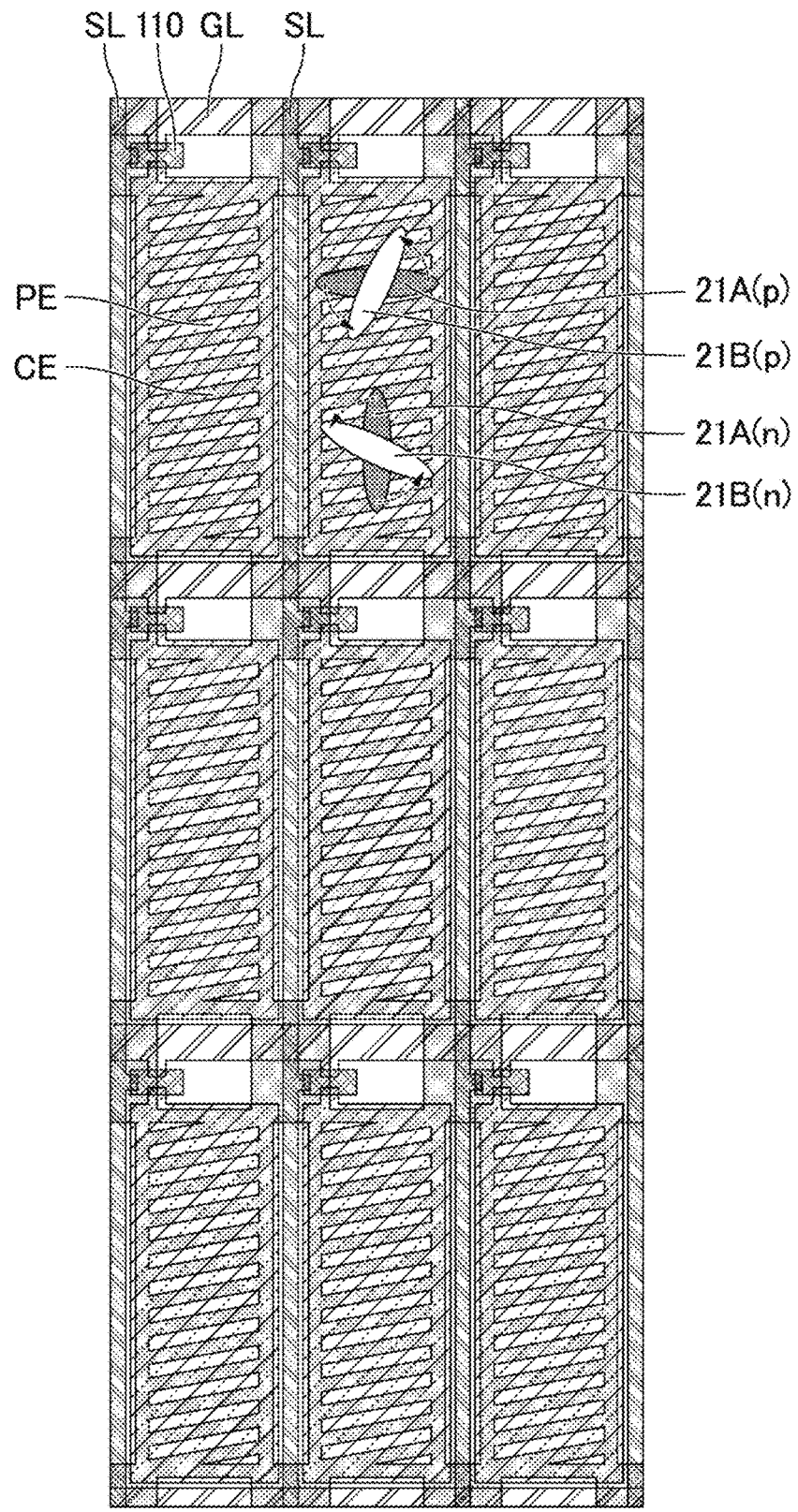
FIG. 6E is a schematic plan view illustrating an example of an arrangement of pixels (angle X is −100°).
Figure 6F:
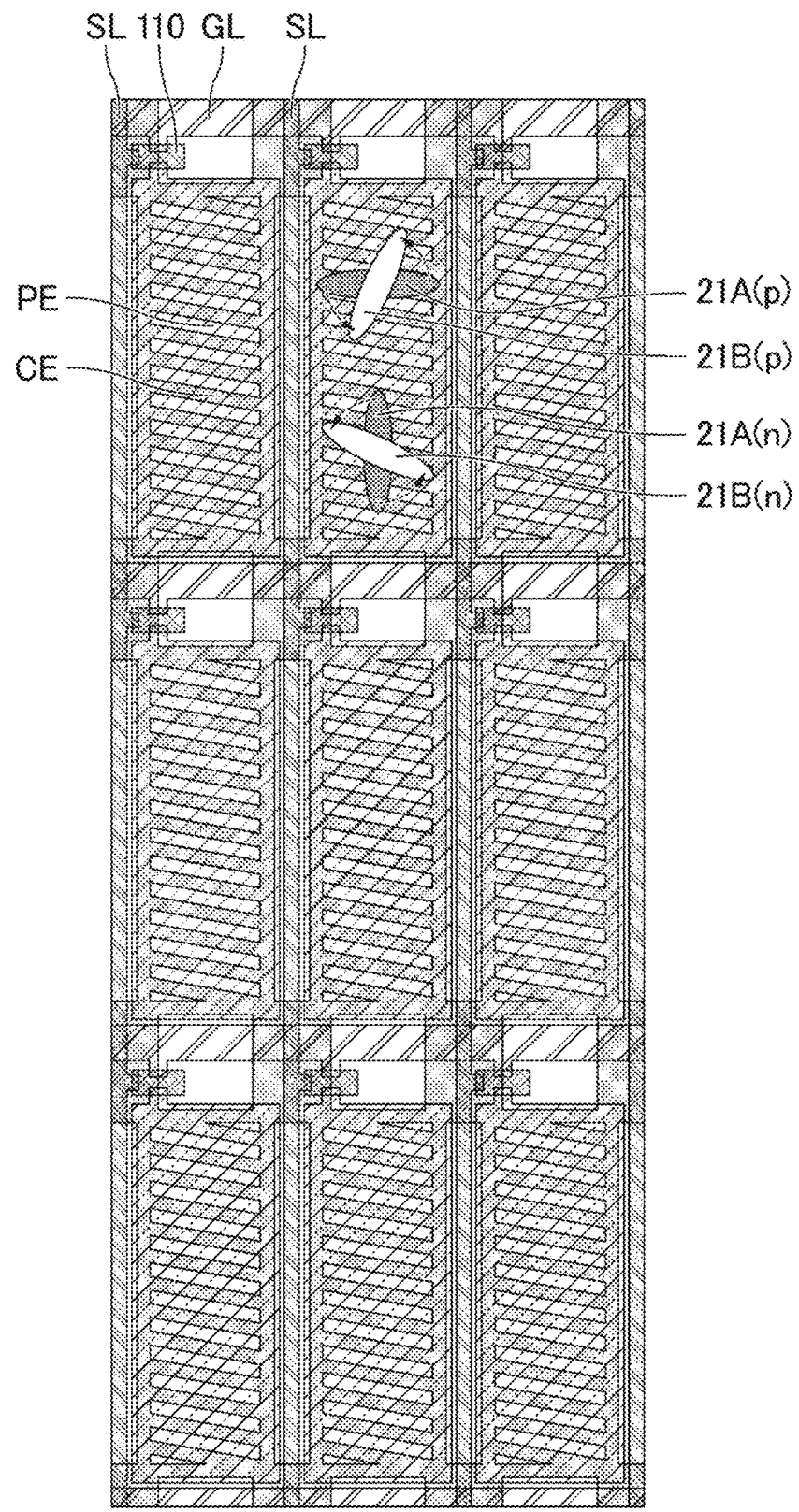
FIG. 6F is a schematic plan view illustrating an example of an arrangement of pixels (angle X is −80°).

FIG. 5 and FIG. 6A illustrate an example in which if an angle formed when the extending direction is rotated clockwise is a positive angle (+) and an angle formed when the extending direction is rotated counterclockwise is a negative angle (−) when the extending direction of the source wiring line SL is used as a reference (0°), the extending direction of the plurality of belt-shaped portions SP (such an angle is referred to as an angle X) is 0°. Examples in which the angles X are −10°, +10°, −90°, −100°, and −80° are illustrated in FIG. 6B, FIG. 6C, FIG. 6D, FIG. 6E, and FIG. 6F, respectively. An aspect in which the angle X is 0° (see FIG. 5 and FIG. 6A) corresponds to an aspect in which the extending direction of the plurality of belt-shaped portions SP is parallel to the extending direction of the source wiring line SL, and an aspect in which the angle X is −90° (see FIG. 6D) corresponds to an aspect in which the extending direction of the plurality of belt-shaped portions SP is parallel to the extending direction of the gate wiring line GL.

FIG. 5 and FIG. 6A to FIG. 6F are schematic plan views schematically illustrating specific examples of the pixel. In particular, FIG. 5 is a schematic plan view illustrating an example of a structure of the pixel, and FIG. 6A to FIG. 6F are schematic plan views each illustrating an example of arrangement of the pixel. FIG. 6A to FIG. 6F illustrate a twist alignment of the liquid crystal molecules 21. The liquid crystal molecules 21A mean the liquid crystal molecules 21 in the vicinity of the first horizontal alignment film 140 (that is, the liquid crystal molecules on the first substrate 10 side when no voltage is applied), and liquid crystal molecules 21B mean the liquid crystal molecules 21 in the vicinity of the second horizontal alignment film 340 (that is, the liquid crystal molecules on the second substrate 30 side when a voltage is applied). A symbol (p) added at an end of a reference numeral of each liquid crystal molecule means a positive-working liquid crystal molecule, and a symbol (n) means a negative-working liquid crystal molecule.

In the present embodiment, a configuration in which the pixel electrode PE is provided above the common electrode CE is described, but in a relatively large liquid crystal display device, that is, a liquid crystal display device in which the pixel P area is relatively large, the pixel electrode PE is preferably provided above the common electrode CE. In such a configuration (also referred to as a V2 structure), it is not necessary to form a slit in the common electrode CE serving as a lower layer electrode, and thus, as compared with a configuration in which the common electrode CE is provided above the pixel electrode PE (also referred to as a V3 structure), an increase in resistivity (sheet resistivity) of the common electrode CE is suppressed, and therefore, a decrease in a fringe electrical field applied to the liquid crystal layer 20 is suppressed. In such a configuration (V2 structure), if the pixel electrode PE is a slit electrode, the resistivity of the pixel electrode PE increases, but since a voltage input from outside is applied to the pixel electrode PE, it is easy to reduce an influence caused due to the increase of the resistivity (that is, to suppress weakening of a fringe electrical field). Note that in order to suppress the increase in the resistivity of the common electrode CE, it is possible to consider using a low resistance wiring line formed from a metal material (for example, connecting the low resistance wiring line to a common electrode), but in such a configuration, an adverse effect on the display due to specular reflection and the like resulting from the low resistance wiring line (for example, a glare, an iridescent diffraction, and an interference pattern) may occur, and it is necessary to block light with a black matrix, and the like, and a reflection aperture ratio may not be sufficiently improved.

In a configuration in which the pixel electrode PE is provided above the common electrode CE, the common electrode CE does not exist in a region where a second contact hole CH2 is formed, and thus, such a region no longer contributes to a reflective display, and as compared with a configuration in which the common electrode CE is provided above the pixel electrode PE, the reflectivity may be lower. The area of the region that does not contribute to the reflective display, such as the contact hole, is required to be of a certain size regardless of the size of the pixel P area. Thus, the proportion of the region that does not contribute to the reflective display in the pixel P increases as the pixel P area decreases (that is, as the definition increases), and the above-described decrease in the reflectivity become significant. Conversely, in a relatively large liquid crystal display device, it is easier to reduce a proportion occupied by a region not contributing to the reflective display within the pixel P, and therefore, it is easier to suppress the decrease in reflectivity described above. For these reasons, in a relatively large liquid crystal display device, it is advantageous to have a configuration in which the pixel electrode PE is provided above the common electrode CE.

On the other hand, as described above, the decrease in reflectivity due to the region where the second contact hole CH2 is formed not contributing to the reflective display increases as the pixel P area becomes smaller (that is, the higher the high definition becomes), and thus, in a liquid crystal display device having a relatively high-definition, that is, in a liquid crystal display device in which the pixel P area is relatively small, it is preferable that the common electrode CE be provided above the pixel electrode PE (see first modified example of a first embodiment described later).

Each of the first electrode 121 and the second electrode 122 is preferably formed of a transparent conductive material. Examples of the transparent conductive material include indium tin oxide (ITO), indium zinc oxide (IZO (registered trademark)), and a mixture thereof.

In an aspect illustrated in FIG. 2, the pixel electrode PE (second electrode 122 in the present embodiment) is electrically connected to the backplane circuit (more specifically, to a drain electrode of the TFT 110) via a contact electrode 160. The contact electrode 160 is formed in the same layer as the reflective film 130, and is formed of the same material (metal film and the like) as the reflective film 130. The first interlayer insulating layer 151 is formed with a first contact hole CH1 that exposes a part of the backplane circuit BP (more specifically, at least a part of the drain electrode of the TFT 110), and in the first contact hole CH1, the contact electrode 160 is connected to the backplane circuit BP. The second interlayer insulating layer 152 is formed with the second contact hole CH2 that exposes a part of the contact electrode 160, and the pixel electrode PE (second electrode 122 in the present embodiment) is connected to the contact electrode 160, in the second contact hole CH2.

A dielectric layer 153 is provided so as to cover the first electrode 121. The dielectric layer 153 is preferably formed of an inorganic insulating material. The inorganic insulating film obtained by using the inorganic insulating material has already been described above.

The first horizontal alignment film 140 is provided on the second electrode 122 and is in contact with the liquid crystal layer 20. Therefore, it can be said that the first electrode 121 and the second electrode 122 are disposed between the second interlayer insulating layer 152 and the first horizontal alignment film 140.

The first horizontal alignment film 140 and a second horizontal alignment film 340 described later are each subjected to an alignment treatment, and define the orientation direction (also referred to as an alignment direction) of the liquid crystal molecules 21 included in the liquid crystal layer 20. For example, the alignment treatment is preferably performed by a photo-alignment treatment or a rubbing treatment. In the photo-alignment treatment, a photo-decomposition type photo-alignment film material can be used, and in the rubbing treatment, an alignment film material such as polyimide is preferably used.

Each of the first horizontal alignment film 140 and the second horizontal alignment film 340 is a horizontal alignment film that aligns the liquid crystal molecules 21 in a direction horizontal to the first substrate 10 and the second substrate 30, in a state where no voltage is applied to the liquid crystal layer 20. That is, the liquid crystal molecules 21 are horizontally oriented in a state where no voltage is applied to the liquid crystal layer 20. A pretilt angle is substantially 0°.

The orientation direction of the liquid crystal molecules 21 defined by the first horizontal alignment film 140 and the orientation direction of the liquid crystal molecules 21 defined by the second horizontal alignment film 340 are different from each other. Therefore, the liquid crystal layer 20 takes a twist alignment when no voltage is applied (see FIG. 2). When a voltage is applied to the liquid crystal layer 20, that is, when a transverse electrical field is generated in the liquid crystal layer 20 by the first electrode 121 and the second electrode 122, an alignment state of the liquid crystal layer 20 is changed by the transverse electrical field (fringe electrical field).

Liquid Crystal Layer

The liquid crystal layer 20 is located between the first substrate 10 and the second substrate 30 and contains a positive-working liquid crystal material or a negative-working liquid crystal material. The positive-working liquid crystal material means a nematic liquid crystal material having a positive anisotropy of dielectric constant $\Delta\varepsilon$, and the negative-working liquid crystal material means a nematic liquid crystal material having a negative anisotropy of dielectric constant $\Delta\varepsilon$. The anisotropy of dielectric constant $\Delta\varepsilon$ is a difference between the dielectric constant $\varepsilon_{//}$ in the long-axis direction and the dielectric constant $\varepsilon_{\perp}$ in the short-axis direction of the liquid crystal molecules 21 (that is, $\varepsilon_{//} - \varepsilon_{\perp}$).

In the positive-working liquid crystal material, a birefringence index $\Delta n$ of such a liquid crystal material is, for example, preferably 0.123 or less, more preferably 0.12, and still more preferably 0.119 or less. Note that in consideration of a manufacturing viewpoint (yield, and the like), a thickness d of the liquid crystal layer 20 is suitably equal to or greater than 2 μm, and in such a case, $\Delta n$ is suitably 0.123 or less. More preferably, d is 2.5 μm or greater and $\Delta n$ is 0.098 or less. However, from the viewpoint of a response, a cell thickness is suitably smaller. It is preferable that the anisotropy of dielectric constant $\Delta\varepsilon$ of the liquid crystal material be, for example, equal to or greater than 10.

In a case of the negative-working liquid crystal material, the birefringence index $\Delta n$ of the liquid crystal material is, for example, preferably 0.123 or less, and more preferably 0.12. In particular, it is suitable that the thickness d of the liquid crystal layer 20 is 2 μm or greater and $\Delta n$ is 0.123 or less. More preferably, d is 2.5 μm or greater and $\Delta n$ is 0.098 or less. The anisotropy of dielectric constant $\Delta\varepsilon$ of the liquid crystal material is preferably, for example, −5 or less. Note that as $\Delta\varepsilon$ is smaller (or an absolute value of $\Delta\varepsilon$ is larger), a VR curve (a threshold value, a reflectivity Max value, or the like) is shifted to a lower voltage side.

In selecting a positive-working liquid crystal material or a negative-working liquid crystal material, it is preferable to consider an application, a desired performance, and the like. For example, from the viewpoint of realizing flickerlessness (also referred to as being flicker-free), it is suitable to use the negative-working liquid crystal material. The reason for this is as follows. In a transverse electrical field mode such as an FFS mode using the positive-working liquid crystal material, due to an influence of a fine slit electrode on an electrode (that is, a fringe electrical field) when a voltage is applied, a flexoelectric polarization spontaneously occurs in the liquid crystal layer. It is considered that the liquid crystal responds according to the flexoelectric polarization, and thus, a luminance changes at the time of a polarity inversion, and therefore flicker is easily recognized. From the viewpoint of a reliability, it is suitable to use the positive-working liquid crystal material.

The liquid crystal layer 20 may further contain a chiral agent, if necessary. The liquid crystal layer 20 can be formed, for example, by a dropping method.

The thickness d (also referred to as a cell gap or a cell thickness) of the liquid crystal layer 20 is preferably 3.6 μm or less, for example. The thickness is more preferably 2.0 to 3.4 μm. From the viewpoint of a response speed, the thickness is preferably 3 μm or less. It is suitable that the cell thickness is small from the viewpoint of cost reduction because the number of materials can be reduced. However, if it is too small, a display quality may not be improved due to an unevenness of the cell thickness or a foreign matter, and there occurs a trade-off with an occurrence rate of a display quality defect. From the viewpoint of a yield, the thickness is suitably equal to or greater than 2 μm, as described above.

The liquid crystal layer 20 suitably has a single domain alignment (also referred to as mono domain alignment) from the viewpoint of suppressing an alignment disorder.

Second Substrate

The second substrate 30 is disposed to face the first substrate 10 with the liquid crystal layer 20 interposed therebetween, and includes the second horizontal alignment film 340 in contact with the liquid crystal layer 20. The second substrate 30 preferably further includes a support substrate 300 and a color filter layer 310. For example, as illustrated in FIG. 2, the second substrate 30 includes the second horizontal alignment film 340, the color filter layer 310, and the support substrate 300, in order from the liquid crystal layer 20 side. The second substrate 30 also preferably includes a plurality of columnar spacers (not illustrated). Note that the first substrate 10 may have a plurality of columnar spacers.

The support substrate 300 preferably is transparent and has an insulating property, and examples of the support substrate 300 include a glass substrate and a plastic substrate.

The color filter layer 310 typically includes a red color filter being provided in a region corresponding to a red pixel and transmitting red light, a green color filter being provided in a region corresponding to a green pixel and transmitting green light, and a blue color filter being provided in a region corresponding to a blue pixel and transmitting blue light. However, the number of types of color filters may be two or less, or four or greater. Further, when a color display is not performed, the color filter layer 310 is omitted.

An overcoat layer (also referred to as a flattened layer) may be provided to cover the color filter layer 310 if necessary. Note that depending on a material forming an electrode (for example, a transparent conductive material), a material forming an interlayer insulating layer or a dielectric layer, and a material forming an alignment film, a white display may be yellowish. In this case, chromaticity adjustment (that is, blue shift) may be performed by forming the overcoat layer with a blue resist to bring the chromaticity of the white display close to the chromaticity of a D65 light source, for example. The D65 light source is a CIE standard light source D65.

In the liquid crystal display device 1 according to the present embodiment, display is performed in the transverse electrical field mode in which the liquid crystal layer 20 takes a twist alignment when no voltage is applied. As a result, the cell gap can be increased, and a variation width of a contrast can be reduced with respect to a variation of the cell gap. Therefore, an occurrence of a display unevenness is sufficiently suppressed, and a contrast of a reflective display is improved. The twist angle $\theta_1$ of the liquid crystal layer 20 when no voltage is applied is suitably 58.3° or greater and 89.9° or less. A more preferable range will be described later.

The twist angle $\theta_1$ of the liquid crystal layer 20 is an angle formed by the orientation direction of the liquid crystal molecules 21 defined by the first horizontal alignment film 140 and the orientation direction of the liquid crystal molecules 21 defined by the second horizontal alignment film 340. That is, the angle is formed by the long-axis direction of the liquid crystal molecules 21A in the vicinity of the first horizontal alignment film 140 (also referred to as the liquid crystal molecules 21A on the first substrate 10 side when no voltage is applied) and the long-axis direction of the liquid crystal molecules 21B in the vicinity of the second horizontal alignment film 340 (also referred to as the liquid crystal molecules 21B on the second substrate 30 side when a voltage is applied).

The liquid crystal display device 1 is suitably in a normally black mode from the viewpoint of further increasing a contrast ratio. The normally black mode is a display mode in which a black display is performed in a voltage non-applied state and a white display is performed in a voltage applied state.

In addition to the above-mentioned members, the liquid crystal display device 1 is configured by a plurality of members such as an external circuit such as Tape Carrier Package (TCP) and Printed Wiring Board (PCB); an optical film such as a viewing angle expansion film and a luminance enhancement film; and a bezel (frame), and some of such members may be incorporated into another member. Such members are not particularly limited, and those commonly used in the field of liquid crystal display devices can be used, and thus, the explanation will be omitted.

Application Example

The liquid crystal display device 1 according to the present embodiment is suitably used for various purposes. In particular, the liquid crystal display device 1 can be preferably applied to a touch panel. Even when applying the liquid crystal display device 1 to either an external touch panel or a built-in touch panel, the contrast ratio can be improved at a lower cost than a known touch panel, hence being useful. In particular, the liquid crystal display device 1 can be suitably applied to the built-in touch panel, and can be particularly suitably applied to an in-cell type touch panel. Thus, when the liquid crystal display device 1 according to the present embodiment is used, it is possible to suitably realize an in-cell type touch panel capable of performing display in a reflection mode, which has not been possible until now.

When the in-cell type touch panel capable of performing display in a reflection mode can be realized, for example, a frame wiring line region required for an external touch panel can be eliminated, and thus, it is possible to achieve frame narrowing, and a touch panel function can be mounted without a cover glass, and thus, it is possible to contribute to reduction in thickness and weight. The touch function and the display function are driven in a time division manner, and thus, the touch panel is not affected by Liquid Crystal Display (LCD) noise which may be the largest noise source. That is, a killer pattern is not generated, and thus, tuning (adjustment) of the touch signal is easy. Further, a loss of reflected light is sufficiently small, a pen writing is more natural, and a display without a sense of incongruity is obtained. Compared with the external touch panel, a total cost can be reduced from the user's viewpoint. Input by a finger and a pen input by an electromagnetic induction method (EMR) can be combined, and a highly accurate pen writing can be realized.

Figure 7:
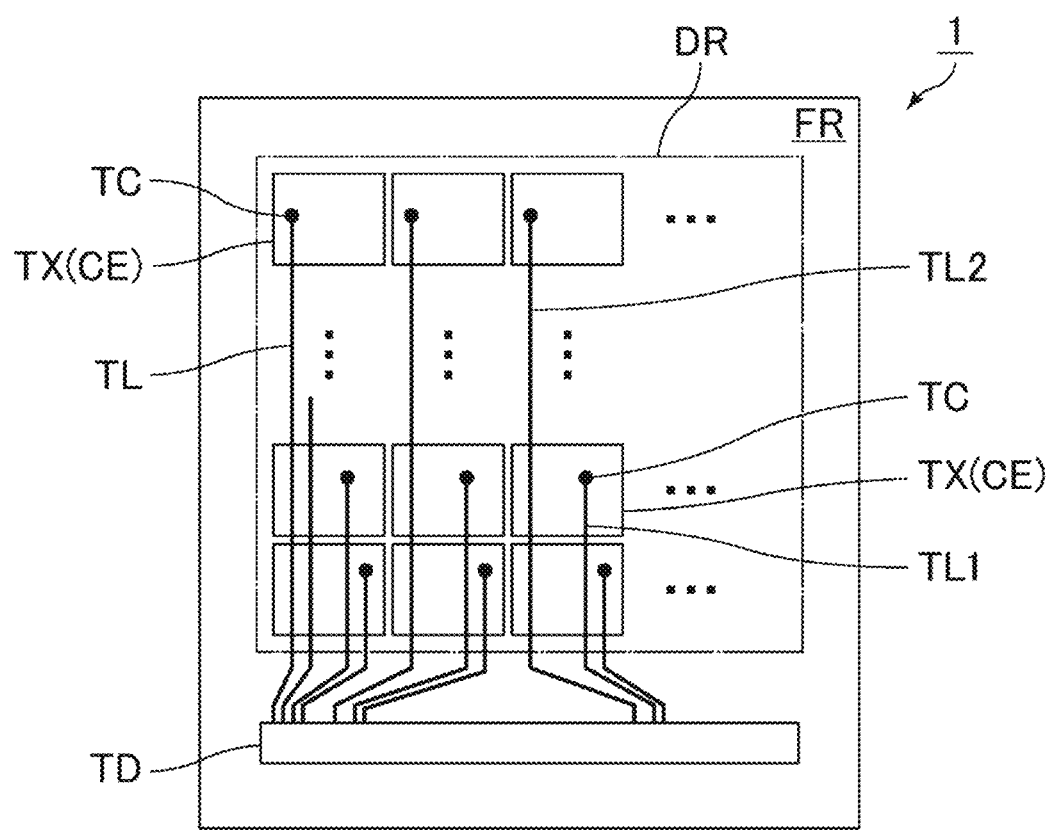
FIG. 7 is a schematic plan view illustrating an arrangement relationship between a touch sensor electrode TX and a touch wiring line TL included in the liquid crystal display device 1.

An example in which the liquid crystal display device 1 is used as the in-cell type touch panel will be further described. FIG. 7 is a schematic plan view illustrating an arrangement relationship between a touch sensor electrode TX and a touch wiring line TL included in the liquid crystal display device 1. As illustrated in FIG. 7, the liquid crystal display device 1 includes a display region DR and a non-display region FR. The display region DR is defined by a plurality of pixels P (see, for example, FIG. 3) arrayed in a matrix shape. The non-display region FR is located around the display region DR, and is also referred to as a peripheral region or a frame region.

Within the display region DR, the common electrode CE is divided into a plurality of segments TX. Each segment (common electrode portion) TX functions as a touch sensor electrode. In the example illustrated in FIG. 7, each touch sensor electrode TX is provided corresponding to two or more pixels P.

The liquid crystal display device 1 (more specifically, the first substrate 10) includes a plurality of the touch wiring lines TL. Each touch sensor electrode TX is electrically connected to a corresponding touch wiring line TL. A connection portion TC between the touch sensor electrode TX and the touch wiring line TL is also referred to as a touch wiring line contact portion TC.

The touch wiring line TL is connected to a touch drive unit TD provided in the non-display region FR. The touch drive unit TD is configured to switch, for example, between a display mode in which the plurality of touch sensor electrodes TX function as the common electrode CE, and a touch detection mode in which the plurality of touch sensor electrodes TX function as the touch sensor electrode TX, in a time division manner. The touch drive unit TD, for example, applies a common signal to the touch sensor electrode TX (common electrode CE) through the touch wiring line TL in the display mode. On the other hand, in the touch detection mode, the touch drive unit TD applies a touch drive signal to the touch sensor electrode TX through the touch wiring line TL.

In FIG. 7, the plurality of touch wiring lines TL extend in a column direction (the same direction as the source wiring line SL). Some touch wiring lines TL extend across one or a plurality of other touch sensor electrodes TX to the corresponding touch sensor electrodes TX.

When attention is paid to one touch sensor electrode TX, a first touch wiring line TL1 for supplying a signal to the one touch sensor electrode TX extends to the touch wiring line contact portion TC, and a second touch wiring line TL2 for supplying a signal to another touch sensor electrode TX extends across the one touch sensor electrode TX. The second touch wiring line TL2 and a touch sensor electrode TX overlap each other with an insulating layer interposed therebetween. Note that depending on a position of the touch sensor electrode TX, two or more touch wiring lines TL may be arranged so as to extend across the touch sensor electrode TX, or no touch wiring line TL crossing the touch sensor electrode TX may be arranged.

In the non-display region FR, in addition to the touch drive unit TD, a peripheral circuit including drive circuits such as a gate driver that supplies a gate signal to the gate bus line (gate wiring line) GL, a source driver that supplies a source signal to the source bus line (source wiring line) SL, and the like is provided (not illustrated). These drive circuits may, for example, be mounted on the first substrate (TFT substrate) 10, or formed as an integral (monolithic) part. A semiconductor chip including some or all of the drive circuits may be mounted on the non-display region FR.

In the in-cell type touch panel, it is particularly preferable to use an In—Ga—Zn—O-based semiconductor for the TFT 110. From the viewpoint of realizing flickerlessness (also referred to as being flicker-free), it is particularly suitable to use a negative-working liquid crystal material. The reason for this is as follows. In a transverse electrical field mode such as an FFS mode using the positive-working liquid crystal material, due to an influence of a fine slit electrode on an electrode (that is, a fringe electrical field) when a voltage is applied, a flexoelectric polarization spontaneously occurs in the liquid crystal layer. It is considered that the liquid crystal responds according to the flexoelectric polarization, and thus, a luminance changes at the time of a polarity inversion, and therefore flicker is easily recognized.

First Modified Example of First Embodiment

In the first embodiment, the configuration in which the first electrode 121 serving as a lower layer electrode is the common electrode CE and the second electrode 122 serving as an upper layer electrode is the pixel electrode PE has been described. However, conversely, the second electrode 122 may be the common electrode CE and the first electrode 121 may be the pixel electrode PE. In the present example, the second electrode 122 (upper layer electrode) is the common electrode CE, and the first electrode 121 (lower layer electrode) is the pixel electrode PE (see FIG. 8).

Figure 8:
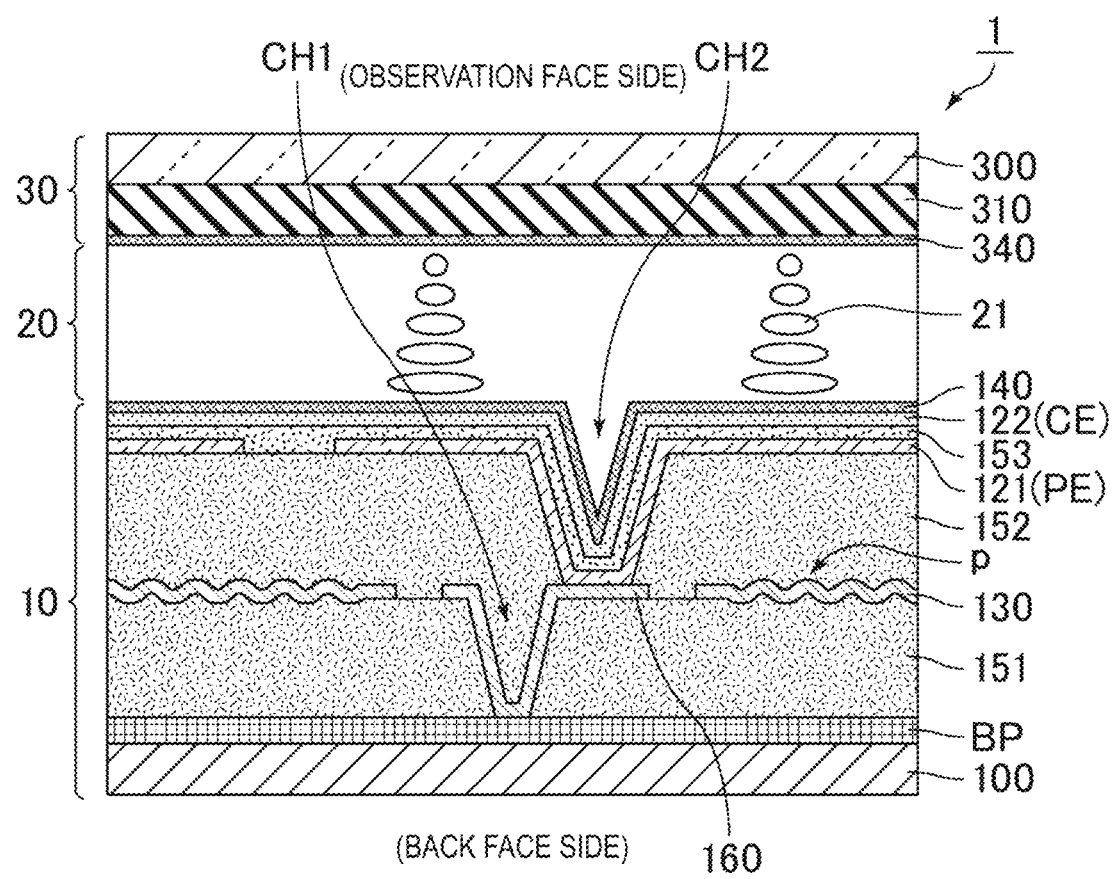
FIG. 8 is a schematic cross-sectional view more specifically illustrating the liquid crystal display device 1 according to a first modified example of the first embodiment.

FIG. 8 is a schematic cross-sectional view illustrating more specifically the liquid crystal display device 1 according to the present example. Also in the present example, it is preferable that from the viewpoint of easily generating a transverse electrical field, at least the upper layer electrode (common electrode CE in the present example) be a slit electrode. The lower layer electrode (pixel electrode PE in the present example) may be a planar electrode, that is, a so-called solid electrode, or may be a slit electrode. The liquid crystal display device 1 according to the present modified example is particularly suitable as a liquid crystal display device having a relatively high-definition as described above, that is, a liquid crystal display device in which the pixel P area is relatively small.

Second Modified Example of First Embodiment

In the first embodiment, an FFS mode liquid crystal display device has been described. However, an IPS mode liquid crystal display device may also be possible (note that the liquid crystal layer 20 takes a twist alignment when no voltage is applied). The present modified example is an IPS mode liquid crystal display device. In the present modified example, it is preferable that the first electrode 121 and the second electrode 122 be provided in the same layer, and each of both the first electrode 121 and the second electrode 122 be a slit electrode.

Second Embodiment

In the present embodiment, features unique to the present embodiment will be mainly described, and a description of contents overlapping the above-described first embodiment will be omitted. The present embodiment is substantially the same as the first embodiment except that the liquid crystal display device further includes a phase difference layer 40 and a polarizer 50.

Figure 9:
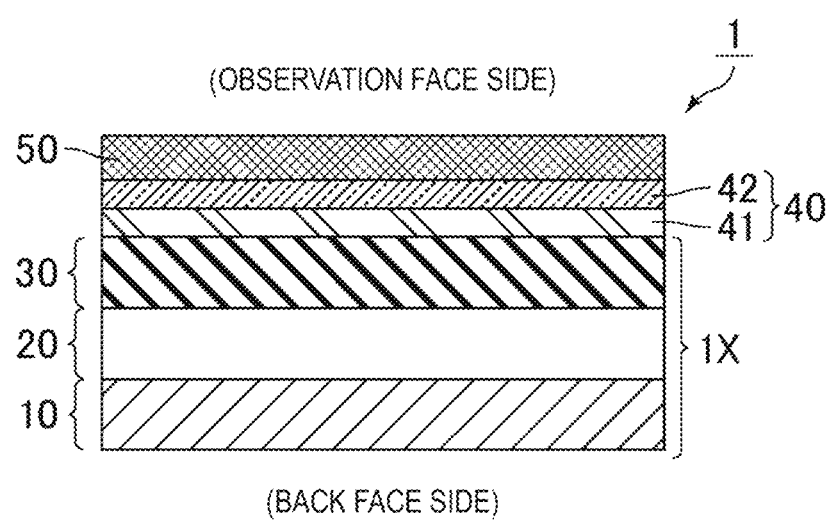
FIG. 9 is a schematic cross-sectional view of the liquid crystal display device 1 according to an example of a second embodiment.
Figure 10:
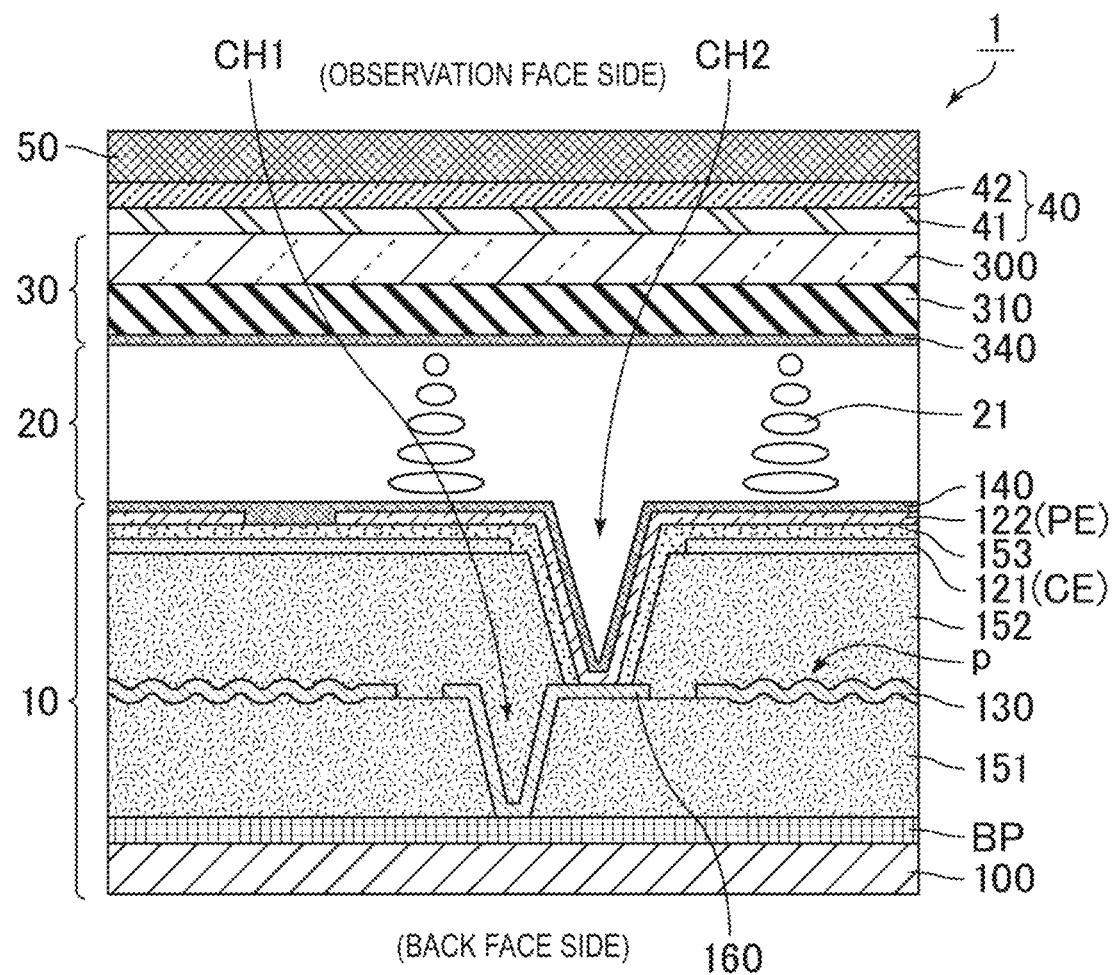
FIG. 10 is a schematic cross-sectional view illustrating more specifically the liquid crystal display device 1 according to an example of the second embodiment.

FIG. 9 is a schematic cross-sectional view of the liquid crystal display device 1 according to an example of the present embodiment, and FIG. 10 is a schematic cross-ssectional view illustrating more specifically the liquid crystal display device 1 according to an example of the present embodiment. As illustrated in FIG. 9, the liquid crystal display device 1 includes the first substrate 10, the liquid crystal layer 20, the second substrate 30, the phase difference layer 40, and the polarizer 50, in order from the back face side. In the present embodiment, a TFT substrate is used as the first substrate 10.

Phase Difference Layer

It is suitable that the phase difference layer 40 is located between the second substrate 30 and the polarizer 50, and includes λ/4 plate 41 and a λ/2 plate 42 (see FIG. 9 and FIG. 10). When the λ/4 plate 41 and the λ/2 plate 42 are arranged, such plates 41 and 42 are suitably located in order from the liquid crystal layer 20 (and the second substrate 30) side (see FIG. 9 and FIG. 10).

The λ/4 plate means a phase difference plate that imparts an in-plane phase difference of a ¼ wavelength to incident light having a wavelength λ, and is also referred to as a λ/4 wavelength plate or a quarter-wave plate (QWP). Specifically, the λ/4 plate 41 is capable of converting linearly polarized light into circularly polarized light or circularly polarized light into linearly polarized light. For example, the linearly polarized light incident on the λ/4 plate 41 becomes circularly polarized light when emitted from the λ/4 plate 41.

The λ/2 plate means a phase difference plate that imparts an in-plane phase difference of a ½ wavelength to incident light having a wavelength λ, and is also referred to as a λ/2 wavelength plate, a half-wavelength plate, or a half-wave plate (HWP). Specifically, the λ/2 plate 42 is capable of rotating a vibration direction of an incident light beam by approximately 90°. For example, the circularly polarized light incident on the λ/2 plate 42 becomes circularly polarized light having an opposite turning direction at the time of emission.

Specifically, it is preferable to use a uniaxial A plate as the λ/4 plate 41 and the λ/2 plate 42.

Polarizer

The polarizer 50 is located closer to the observation face side with respect to the phase difference layer 40 (see FIG. 9 and FIG. 10). The polarizer 50 may be a circular polarizer or a linear polarizer. Here, the linear polarizer means a polarizer having a function of extracting polarized light (linearly polarized light) vibrating only in a specific direction from unpolarized light (natural light), partially polarized light, or polarized light, and is distinguished from a circular polarizer. In particular, the polarizer 50 is preferably the linear polarizer.

The polarizer 50 may also be an absorption-type polarizer or a reflection-type polarizer. The absorption-type polarizer is a polarizer having a function of absorbing light vibrating in a specific direction and transmitting polarized light (linearly polarized light) vibrating in a direction perpendicular to such a specific direction. The reflection-type polarizer is a polarizer having a function of reflecting light vibrating in a specific direction and transmitting polarized light (linearly polarized light) vibrating in a direction perpendicular to such a specific direction. In particular, the polarizer 50 is preferably the absorption-type polarizer. In particular, an absorption-type linear polarizer is suitably used.

Examples of the absorption-type polarizer include a polarizer obtained by dying and adsorbing a polyvinyl alcohol film with an anisotropic material such as an iodine complex (or dye), which is followed by then stretching and orienting the film. In general, when the absorption-type polarizer is put to practical use, in order to ensure mechanical strength and resistance to moisture and heat, a protection film such as a triacetyl cellulose film is layered on both sides of the polyvinyl alcohol film. Examples of the reflection-type polarizer include a film in which a plurality of dielectric thin films are layered, a film in which a plurality of thin films having different refractive index anisotropy are layered, a nanowire grid polarizer, and a polarizer using selective reflection of a Cholesteric LC.

When the slit angle is changed, a polarization axis direction 50AA of the polarizer 50, a slow axis direction 41SA of the λ/4 plate 41, and a slow axis direction 42SA of the λ/2 plate are changed in the same direction by the same angle.

Preferred Settings

A preferable setting of a twist angle and a retardation dΔn of the liquid crystal layer 20, an axial setting of an optical film (that is, the polarizer and the phase difference plate), and the like in the present embodiment will be further described below separately for a case where the liquid crystal material configuring the liquid crystal layer 20 is a positive-working material and a case where the liquid crystal material configuring the liquid crystal layer 20 is a negative-working material. Note that the absorption-type polarizer is used as the polarizer 50.

(i) When Liquid Crystal Material is Positive-Working
(i-1) Preferred Setting

Figure 11:
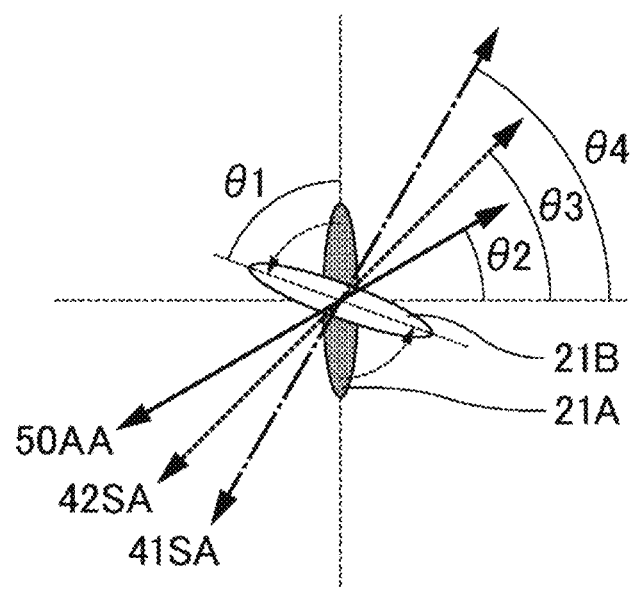
FIG. 11 is a plan view conceptually illustrating a relationship among a long-axis direction of a liquid crystal molecule 21 included in a liquid crystal layer 20 when no voltage is applied, an in-plane slow axis 41SA of a λ/4 plate 41, an in-plane slow axis 42SA of a λ/2 plate 42, and a polarization axis 50AA of a polarizer 50, in the liquid crystal display device 1 including the first substrate 10, the liquid crystal layer 20, the second substrate 30, the λ/4 plate 41, the λ/2 plate 42, and the polarizer 50, in order from a back face side.

FIG. 11 illustrates a particularly preferable optical setting example from the viewpoint of improving the contrast ratio. FIG. 11 is a plan view conceptually illustrating a relationship among the long-axis direction of the liquid crystal molecule 21 included in the liquid crystal layer 20 when no voltage is applied, the in-plane slow axis 41SA of the λ/4 plate 41, the in-plane slow axis 42SA of the λ/2 plate 42, and the polarization axis 50AA of the polarizer 50 when no voltage is applied, in the liquid crystal display device 1 including the first substrate 10, the liquid crystal layer 20, the second substrate 30, the λ/4 plate 41, the λ/2 plate 42, and the polarizer 50, in order from the back face side. In FIG. 11, as the liquid crystal molecule 21, the liquid crystal molecule 21A in the vicinity of the first horizontal alignment film 140 and the liquid crystal molecule 21B in the vicinity of the second horizontal alignment film 340 are illustrated.

In the following description, an angle obtained when a reference azimuthal direction is set to 0° is an angle obtained when a reference azimuthal direction, that is, a direction orthogonal to the extending direction of the plurality of belt-shaped portions SP, is set to a 0° direction (3 o'clock direction) and a twist direction is set to a positive (counterclockwise) direction when FIG. 11 is regarded as a dial of a timepiece. The twist direction means a direction, when the liquid crystal display device 1 is observed from the observation face side, twisted from the orientation direction of the liquid crystal molecule 21A defined by the first horizontal alignment film 140 to the orientation direction of the liquid crystal molecule 21B defined by the second horizontal alignment film 340.

The twist angle $\theta_1$ of the liquid crystal layer 20 when no voltage is applied is suitably 58.3° or greater and 89.9° or less. This improves the contrast ratio. From the viewpoint of further improving the contrast ratio, such an angle is more preferably 64.0° or greater and 88° or less, still more preferably 68.4° or greater and 86° or less, and particularly preferably 71.4° or greater and 84° or less.

When a direction orthogonal to a direction in which the plurality of belt-shaped portions SP extend is used as a reference (0°), the angle $\theta_2$ formed by the polarization axis 50AA of the polarizer 50 is preferably 5° or greater and 35° or less. This improves the contrast ratio. From the viewpoint of further improving the contrast ratio, such an angle is more preferably 15° or greater and 34° or less, and still more preferably 20° or greater and 33° or less.

When a direction orthogonal to a direction in which the plurality of belt-shaped portions SP extend is used as a reference (0°), the angle θ3 formed by the in-plane slow axis 42SA of the λ/2 plate 42 is preferably 25° or greater and 50° or less. This improves the contrast ratio. From the viewpoint of further improving the contrast ratio, such an angle is more preferably 35° or greater and 49° or less, and still more preferably 40° or greater and 48° or less.

When a direction orthogonal to a direction in which the plurality of belt-shaped portions SP extend is used as a reference (0°), the angle θ4 formed by the in-plane slow axis 41SA of the λ/4 plate 41 is preferably 45° or greater and 70° or less. This improves the contrast ratio. From the viewpoint of further improving the contrast ratio, such an angle is more preferably 55° or greater and 68° or less, and still more preferably 60° or greater and 66° or less.

The retardation of the liquid crystal layer 20, that is, a product (dΔn) of the thickness d of the liquid crystal layer 20 and a birefringence index Δn of the liquid crystal material is preferably 152.3 nm or greater and 285.8 nm less. This improves the contrast ratio. From the viewpoint of further improving the contrast ratio, such a retardation is more preferably 176.9 nm or greater and 260.8 nm or less, still more preferably 195.8 nm or greater and 250 nm or less, and particularly preferably 207.0 nm or greater and 248 nm or less.

(ii) When Liquid Crystal Material is Negative-Working
(ii-1) Preferred Setting

Figure 12:
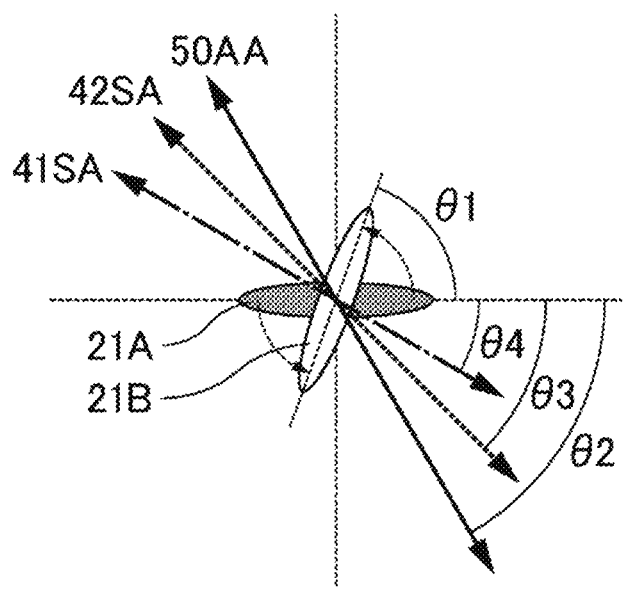
FIG. 12 is a plan view conceptually illustrating a relationship among a long-axis direction of the liquid crystal molecule 21 included in the liquid crystal layer 20 when no voltage is applied, the in-plane slow axis 41SA of the λ/4 plate 41, the in-plane slow axis 42SA of the λ/2 plate 42, and the polarization axis 50AA of the polarizer 50, in the liquid crystal display device 1 including the first substrate 10, the liquid crystal layer 20, the second substrate 30, the λ/4 plate 41, the λ/2 plate 42, and the polarizer 50, in order from the back face side.

FIG. 12 illustrates a particularly preferable optical setting example from the viewpoint of improving the contrast ratio. FIG. 12 is a plan view conceptually illustrating a relationship among the long-axis direction of the liquid crystal molecule 21 included in the liquid crystal layer 20 when no voltage is applied, the in-plane slow axis 41SA of the λ/4 plate 41, the in-plane slow axis 42SA of the λ/2 plate 42, and the polarization axis 50AA of the polarizer 50 when no voltage is applied, in the liquid crystal display device 1 including the first substrate 10, the liquid crystal layer 20, the second substrate 30, the λ/4 plate 41, the λ/2 plate 42, and the polarizer 50, in order from the back face side. In FIG. 12, as the liquid crystal molecule 21, the liquid crystal molecule 21A in the vicinity of the first horizontal alignment film 140 and the liquid crystal molecule 21B in the vicinity of the second horizontal alignment film 340 are illustrated.

In the following description, an angle obtained when a reference azimuthal direction is set to 0° is an angle obtained when a reference azimuthal direction, that is, a direction orthogonal to the extending direction of the plurality of belt-shaped portions SP, is set to a 0° direction (3 o'clock direction) and a twist direction is set to a positive (counterclockwise) direction when FIG. 12 is regarded as a dial of a timepiece.

The twist angle θ₁ of the liquid crystal layer 20 when no voltage is applied is suitably 58.3° or greater and 89.9° or less. This improves the contrast ratio. From the viewpoint of further improving the contrast ratio, such an angle is more preferably 64.0° or greater and 88° or less, still more preferably 68.4° or greater and 86° or less, and particularly preferably 71.4° or greater and 84° or less.

When a direction orthogonal to a direction in which the plurality of belt-shaped portions SP extend is used as a reference (0°), the angle θ2 formed by the polarization axis 50AA of the polarizer 50 is preferably −85° or greater and −55° or less. This improves the contrast ratio. From the viewpoint of further improving the contrast ratio, such an angle is more preferably −75° or greater and −56° or less, and still more preferably −70° or greater and −57° or less.

When a direction orthogonal to a direction in which the plurality of belt-shaped portions SP extend is used as a reference (0°), the angle θ₃ formed by the in-plane slow axis 42SA of the λ/2 plate 42 is preferably −65° or greater and −40° or less. This improves the contrast ratio. From the viewpoint of further improving the contrast ratio, such an angle is more preferably −55° or greater and −41° or less, and still more preferably −50° or greater and −42° or less.

When a direction orthogonal to a direction in which the plurality of belt-shaped portions SP extend is used as a reference (0°), the angle θ₄ formed by the in-plane slow axis 41SA of the λ/4 plate 41 is preferably −40° or greater and −15° or less. This improves the contrast ratio. From the viewpoint of further improving the contrast ratio, such an angle is more preferably −30° or greater and −20° or less, and still more preferably −27° or greater and −24° or less.

The retardation of the liquid crystal layer 20, that is, the product (dΔn) of the thickness d of the liquid crystal layer 20 and the birefringence index Δn of the liquid crystal material is preferably 151.2 nm or greater and 285.1 nm or less. This improves the contrast ratio. From the viewpoint of further improving the contrast ratio, such an angle is more preferably 175.9 nm or greater and 250 nm or less, still more preferably 193.8 nm or greater and 246 nm or less, and particularly preferably 204.7 nm or greater and 245 nm or less.

First Modified Example of Second Embodiment

In the second embodiment, the configuration in which the first electrode 121 serving as a lower layer electrode is the common electrode CE and the second electrode 122 serving as an upper layer electrode is the pixel electrode PE has been described. However, conversely, the second electrode 122 may be the common electrode CE and the first electrode 121 may be the pixel electrode PE. In the present example, the second electrode 122 (upper layer electrode) is the common electrode CE, and the first electrode 121 (lower layer electrode) is the pixel electrode PE (see FIG. 13).

Figure 13:
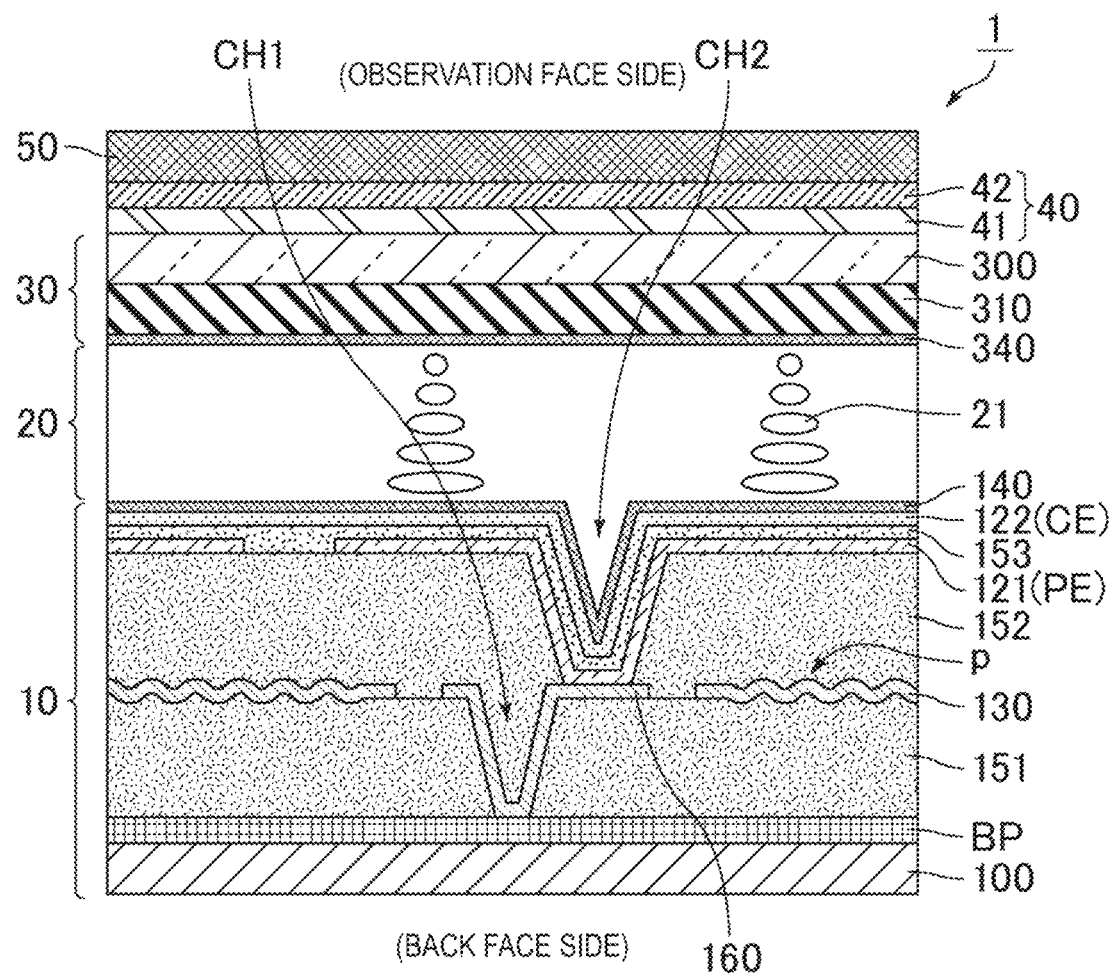
FIG. 13 is a schematic cross-sectional view more specifically illustrating the liquid crystal display device 1 according to the first modified example of the second embodiment.

FIG. 13 is a schematic cross-sectional view illustrating more specifically the liquid crystal display device 1 according to the present example. Also in the present example, it is preferable that from the viewpoint of easily generating a transverse electrical field, at least the upper layer electrode (common electrode CE in the present example) be a slit electrode. The lower layer electrode (pixel electrode PE in the present example) may be a planar electrode, that is, a so-called solid electrode, or may be a slit electrode. The liquid crystal display device 1 according to the present modified example is particularly suitable as a liquid crystal display device having a relatively high-definition as described above, that is, a liquid crystal display device in which the pixel P area is relatively small.

Third Embodiment

In the present embodiment, features unique to the present embodiment will be mainly described, and a description of contents overlapping the above-described first and second embodiments will be omitted. Although the reflective liquid crystal display device has been described as an example in the first and second embodiments, a transflective liquid crystal display device will be described in the present embodiment. The liquid crystal display device of the present embodiment is different from the liquid crystal display device of the second embodiment mainly in that a light source is provided close to the back face side relative to the liquid crystal layer 20.

Figure 14:
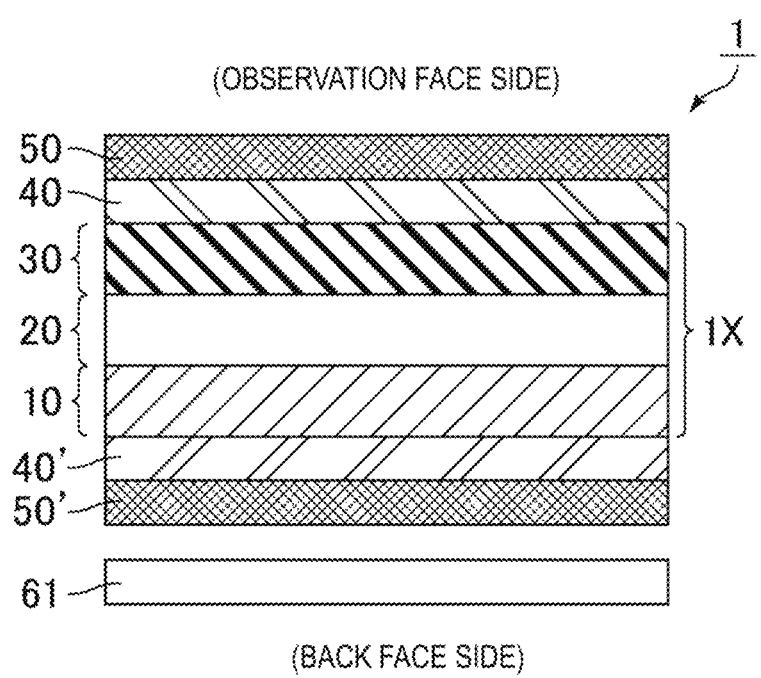
FIG. 14 is a schematic cross-sectional view of the liquid crystal display device 1 according to an example of a third embodiment.

FIG. 14 is a schematic cross-sectional view of the liquid crystal display device 1 according to an example of the present embodiment. The liquid crystal display device 1 further includes a light source 61 (also referred to as a backlight) closer to the back face side relative to the liquid crystal layer 20. It is preferable to further include a polarizer 50' and a phase difference layer 40'. More preferably, as illustrated in FIG. 14, the liquid crystal display device 1 includes the light source 61, the polarizer 50', the phase difference layer 40', the first substrate 10, the liquid crystal layer 20, the second substrate 30, the phase difference layer 40, and the polarizer 50, in order from the back face side. Also in the present embodiment, the TFT substrate is suitable as the first substrate 10.

The light source 61 (backlight) is not particularly limited as long as the light source 61 emits light, and may be a direct type, an edge type, or any other type. Specifically, for example, the light source 61 preferably has a light source such as a light emitting diode (LED), a light guide plate, and a reflective sheet, and may further include a diffuser sheet or a prism sheet.

The polarizer 50' is arranged on the back face side of the liquid crystal layer 20. More specifically, the polarizer 50' is arranged closer to the back face side relative to the first substrate 10. The polarizer 50' may be a circular polarizer or a linear polarizer, but is preferably a linear polarizer. The polarizer 50' may be an absorption-type polarizer or a reflection-type polarizer, but is preferably an absorption-type polarizer. In particular, an absorption-type linear polarizer is suitably used.

The phase difference layer 40' is arranged between the polarizer 50' and the liquid crystal layer 20. More specifically, the phase difference layer 40' is arranged between the polarizer 50' and the first substrate 10. The phase difference layer 40' may include, for example, a λ/4 plate and a λ/2 plate. When such members are arranged, for example, the λ/2 plate and the λ/4 plate are suitably arranged in order from the back face side.

Figure 15:
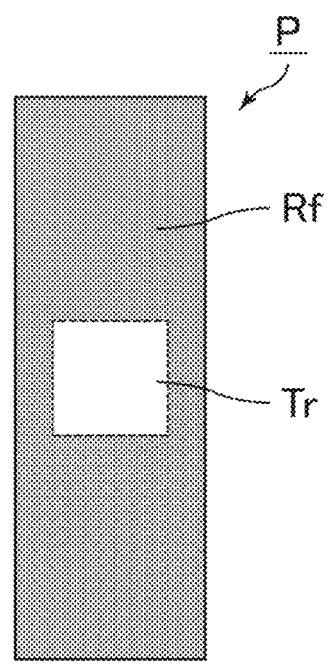
FIG. 15 is a schematic plan view conceptually illustrating that each pixel P has a reflective region Rf and a transmissive region Tr in the liquid crystal display device 1 according to the third embodiment.

In the liquid crystal display device 1 according to the present embodiment, each pixel P has a reflective region Rf for display in a reflection mode and a transmissive region Tr for display in a transmission mode (see FIG. 15). FIG. 15 is a schematic plan view conceptually illustrating that each pixel P has the reflective region Rf and the transmissive region Tr in the liquid crystal display device 1 of the present embodiment. The reflective layer 130 (see FIG. 2, for example) is disposed in the reflective region Rf, but the reflective layer 130 is not disposed in the transmissive region Tr. A proportion of an area occupied by the transmissive region Tr in each pixel P can be set as appropriate depending on each application, but is preferably 20% or greater and 90% or less, for example. The position and the shape of the transmissive region Tr within the pixel P may also be appropriately set depending on the application or the like.

In the liquid crystal display device according to the present embodiment, that is, a transflective liquid crystal display device, similarly to the reflective liquid crystal display device, by performing display in the transverse electrical field mode in which the liquid crystal layer 20 takes the twist alignment when no voltage is applied, it is possible to sufficiently improve the contrast ratio of the reflective display. Therefore, the liquid crystal display device 1 of the present embodiment is also capable of improving the contrast ratio at low cost and is useful as the in-cell type touch panel capable of performing display in the reflection mode.

Fourth Embodiment

In the present embodiment, features unique to the present embodiment will be mainly described, and a description of contents overlapping the above-described first embodiment will be omitted. The liquid crystal display device of the present embodiment is different from the liquid crystal display device of the first embodiment mainly in that the light source is provided close to the observation face side relative to the liquid crystal layer 20. Note that the liquid crystal display device of the present embodiment is the reflective liquid crystal display device.

Figure 16:
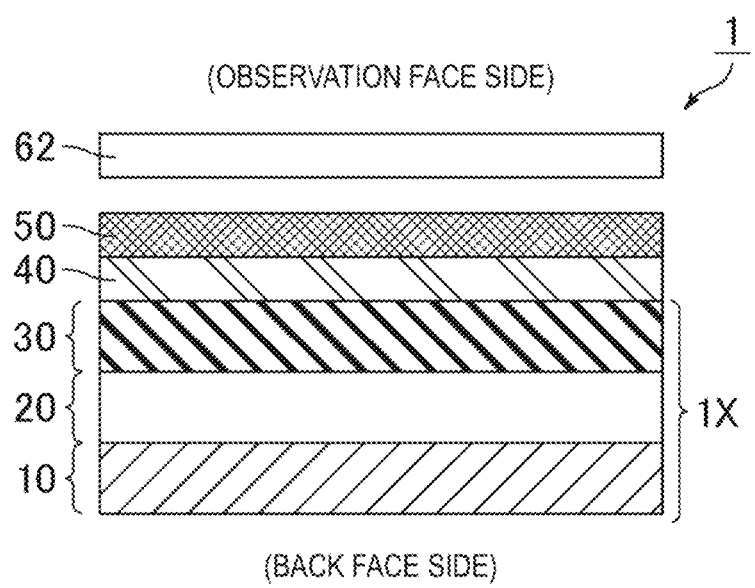
FIG. 16 is a schematic cross-sectional view of the liquid crystal display device 1 according to an example of a fourth embodiment.

FIG. 16 is a schematic cross-sectional view of the liquid crystal display device 1 according to an example of the present embodiment. The liquid crystal display device 1 according to the present embodiment further includes a light source 62 (also referred to as a front light) close to the observation face side relative to the liquid crystal layer 20. More preferably, as illustrated in FIG. 16, the liquid crystal display device 1 according to the present embodiment includes the first substrate 10, the liquid crystal layer 20, the second substrate 30, the phase difference layer 40, the polarizer 50, and the light source 62, in order from the back face side. Also in the present embodiment, the TFT substrate is suitable as the first substrate 10.

The light source 62 (front light) is not particularly limited as long as the light source 62 emits light. Specifically, for example, the light source 62 preferably includes a light source such as a light-emitting diode (LED) and a light guide plate. By having the reflective liquid crystal display device 1 further include the light source 62, a bright reflective display can be performed even in an environment where sufficient ambient light is not available.

Although the embodiments of the disclosure have been described above, all the individual matters described can be applied to the disclosure in general.

The disclosure will be described in more detail with reference to Examples and the like below, but the disclosure is not limited to such Examples. In the following description, the absorption-type polarizer is used as the polarizer 50.

Verification Example 1

Figure 17A:
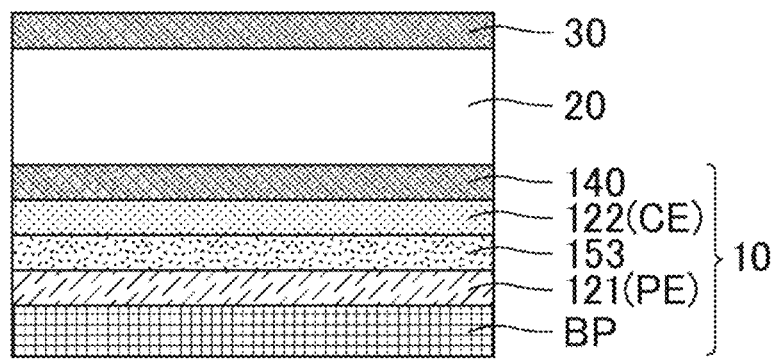
FIG. 17A is a schematic cross-sectional view illustrating a device prepared in Verification Example 1.
Figure 18:
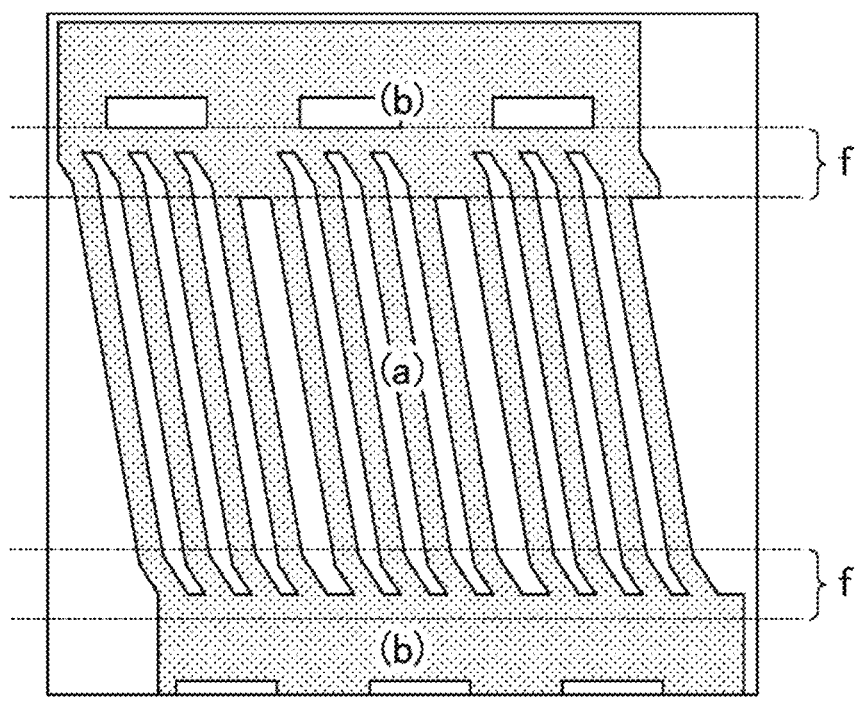
FIG. 18 is a CAD diagram illustrating only a pixel electrode PE and a common electrode CE on a TFT substrate side in a plan view.
Figure 20A:
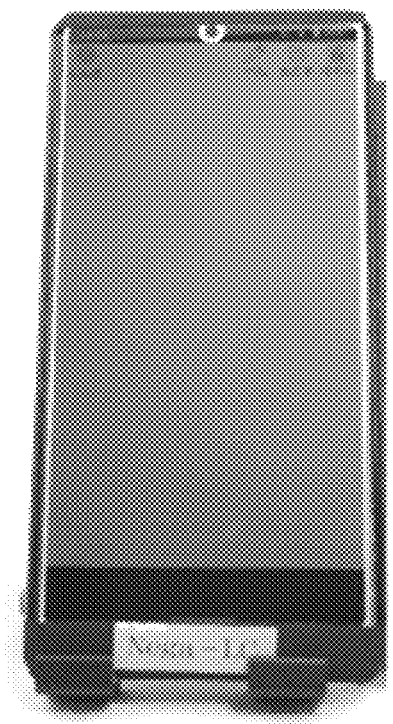
FIG. 20A is a planar photograph obtained by capturing an initial state of the device from an observation face side, in Verification Example 1.

An FFS mode device capable of performing display in the reflection mode was prepared by using the TFT substrate (first substrate) 10 of a mobile model (see FIG. 20A). Specifically, as illustrated in FIG. 17A, the pixel electrode PE and the common electrode CE for applying a voltage to the liquid crystal layer 20 were disposed on the TFT substrate 10 side, and the common electrode CE serving as the upper layer electrode (second electrode 122) was used as a slit electrode having a plurality of belt-shaped portions SP and a slit Sl located between two belt-shaped portions adjacent to each other, as illustrated in FIG. 18. The width L of each belt-shaped portion SP was 1.6 μm, and the width of each slit Sl was 3.0 μm. The plurality of belt-shaped portions SP have linear shapes extending substantially parallel to each other and in the same direction, but are bent somewhere along the way (see f in FIG. 18). An end portion f at such a distal bent end is also referred to as a kink portion or a bending part. A negative-working liquid crystal material was used for the liquid crystal layer 20. The pixel electrode PE serving as the lower layer electrode (first electrode 121) was a solid electrode. Note that a color filter was not provided, and a black-and-white mode was used. FIG. 17A is a schematic cross-sectional view of the device prepared in the present example, and FIG. 18 is a computer aided design (CAD) diagram illustrating only the pixel electrode PE and the common electrode CE on the TFT substrate side in a plan view.

Figure 19:
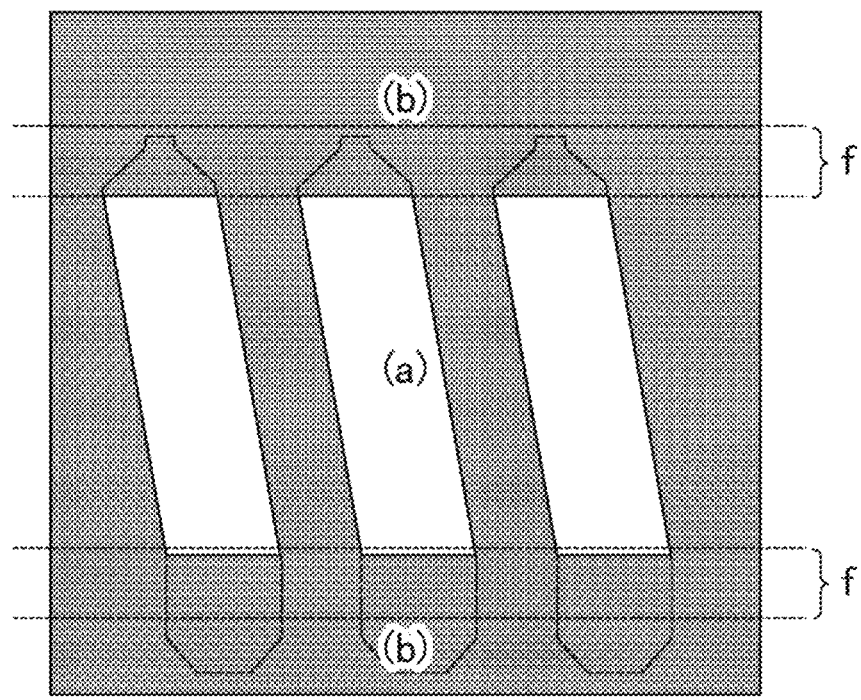
FIG. 19 is an image (planar image) obtained by observing an inside of the device with a microscope, in Verification Example 1.
Figure 20B:
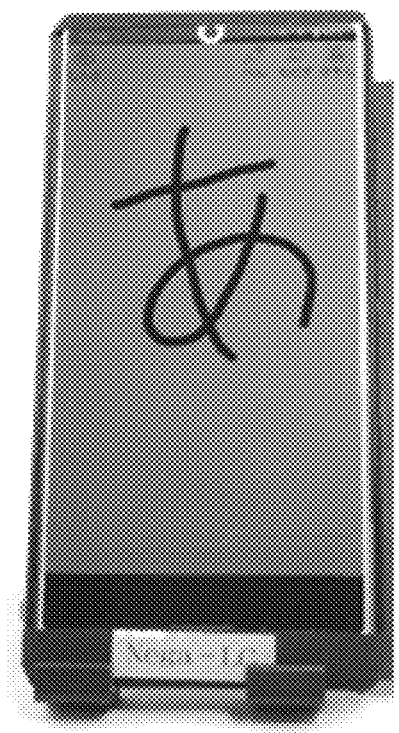
FIG. 20B is a planar photograph obtained when a state in which a black character is written on the device in the initial state is captured from the observation face side, in Verification Example 1.
Figure 20C:
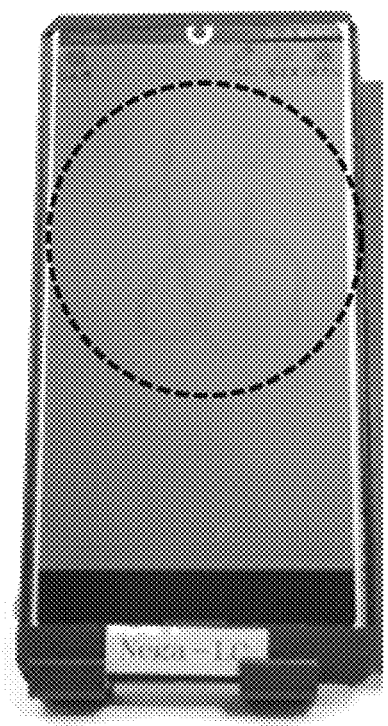
FIG. 20C is a planar photograph obtained when a state in which the written character is erased is captured from the observation face side, in Verification Example 1.

First, the device is brought into a white display state (that is, a 255 gray scale display) as an initial state (see FIG. 20A). Next, when a black character is written in the device in such a state, a black region is generated (see FIG. 20B). Thereafter, the written character is erased (that is, the white display state is reestablished) (see FIG. 20C). When such an operation was performed (see FIG. 20A to FIG. 20C), an afterimage of the character was visually recognized as image sticking (see the inside of the broken line in FIG. 20C). FIG. 20A is a planar photograph of the initial state of the device, captured from the observation face side, FIG. 20B is a planar photograph of a state in which the black character is written in the device in the initial state, captured from the observation face side, and FIG. 20C is a planar photograph of a state in which the written character is erased, captured from the observation face side. When a portion where the afterimage occurred was observed with a microscope ("BX51" manufactured by Olympus Corporation), it was confirmed that an alignment disorder occurred at the end portions f of each common electrode CE which was referred to as a kink portion (see FIG. 19). It is considered that due to the alignment disorder generated in the kink portion f, a luminance difference (that is, a reflectivity difference) occurred between the kink portion f and the other portions (for example, a pixel center portion), and as a result, the afterimage was visually recognized. FIG. 19 is an image (planar image) obtained by observing an inside of the device with a microscope. FIG. 18 illustrates an electrode structure of a portion illustrated in FIG. 19 by CAD.

Figure 21:
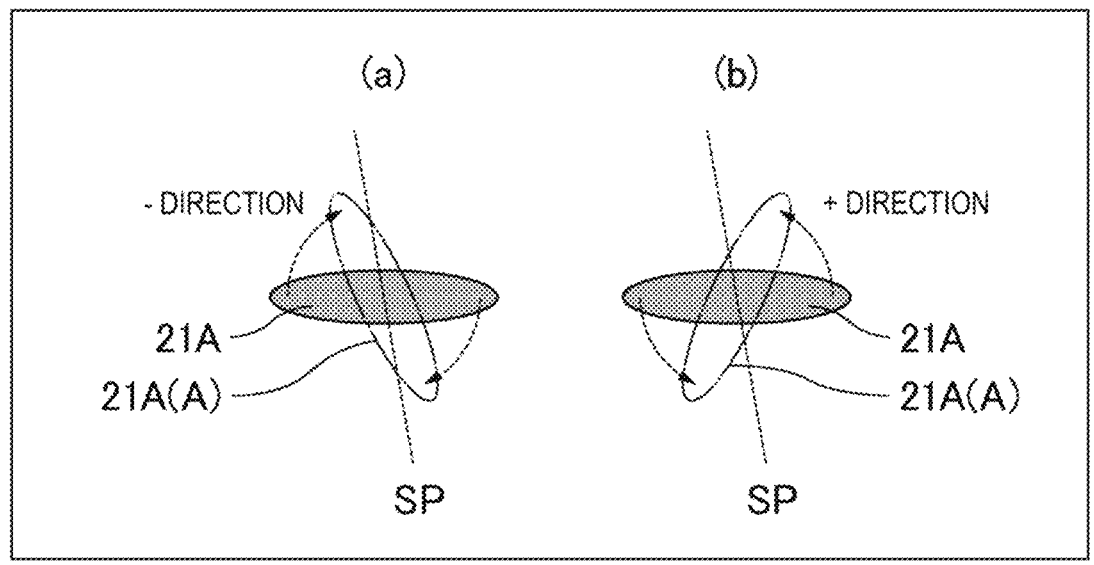
FIG. 21 is a plan view conceptually illustrating that a rotation direction of the liquid crystal molecule 21 (negative-working liquid crystal) is different between a pixel center portion (a) and a pixel end portion (b).

The present inventors have further studied a cause of the occurrence of the alignment disorder. The slit angle of the slit electrode (common electrode CE in the present example) is different between a pixel center portion (vicinity of (a) in FIG. 18 and FIG. 19) and a pixel end portion (vicinity of (b) in FIG. 18 and FIG. 19). In the slit electrode of the present example, the slit angle is −10 degrees at the pixel center portion (a) and is −20 degrees at the pixel end portion (b). The present inventors presumed that due to the difference in the slit angle, the rotation direction of the liquid crystal molecules 21 when a voltage is applied differs (see FIG. 21). FIG. 21 is a plan view conceptually illustrating that the rotation direction of the liquid crystal molecule 21 (negative-working liquid crystal) is different between the pixel center portion (a) and the pixel end portion (b). The alignment of the liquid crystal molecule 21A on the TFT substrate 10 side when no voltage is applied (that is, the initial alignment) is represented by the orientation of the liquid crystal molecule 21A, and the alignment of the liquid crystal molecule 21A on the TFT substrate 10 side when a voltage is applied is represented by the orientation of a liquid crystal molecule 21A(A). With respect to a 3 o'clock direction as 0 degree, the counterclockwise direction is positive (+) and the twist angle is +74 degrees. When a voltage is applied, the liquid crystal molecule 21A rotates clockwise (−) at the pixel center portion (see FIG. 21(*a*)), and rotates counterclockwise (+) at the pixel end portion (see FIG. 21(*b*)). A boundary portion between the pixel center portion and the pixel end portion corresponds to a portion where the slit angle changes, and in such a portion, the alignment of the liquid crystal molecules 21 is discontinuous. Therefore, the alignment disorder occurs, and thus, a luminance difference occurs between the pixel and the pixel in which alignment disorder does not occur, which is considered to be visually recognized as an afterimage.

Figure 22:
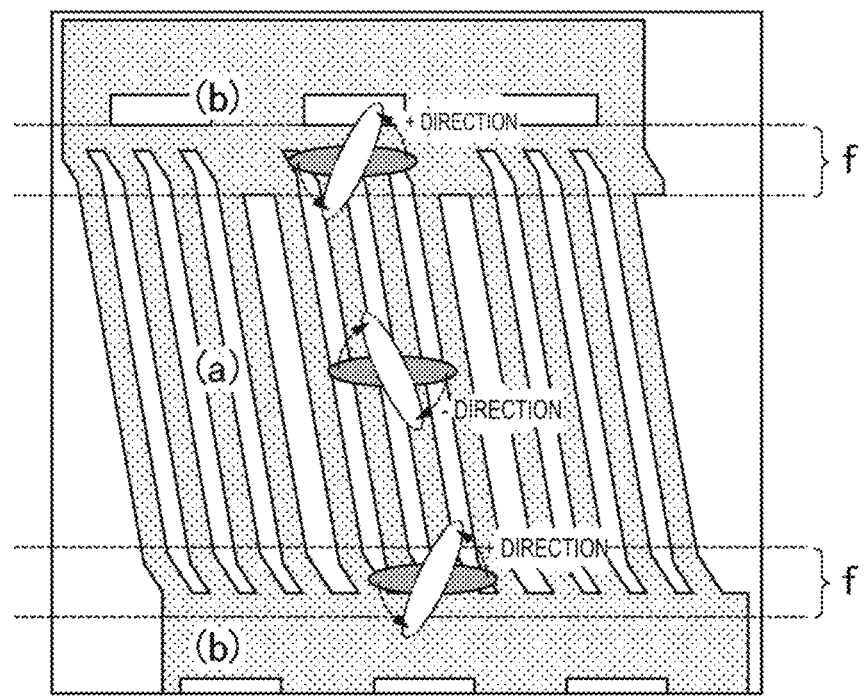
FIG. 22 is a diagram in which a conceptual diagram illustrating the rotation direction of the liquid crystal molecule 21 is superimposed on FIG. 18.
Figure 23:
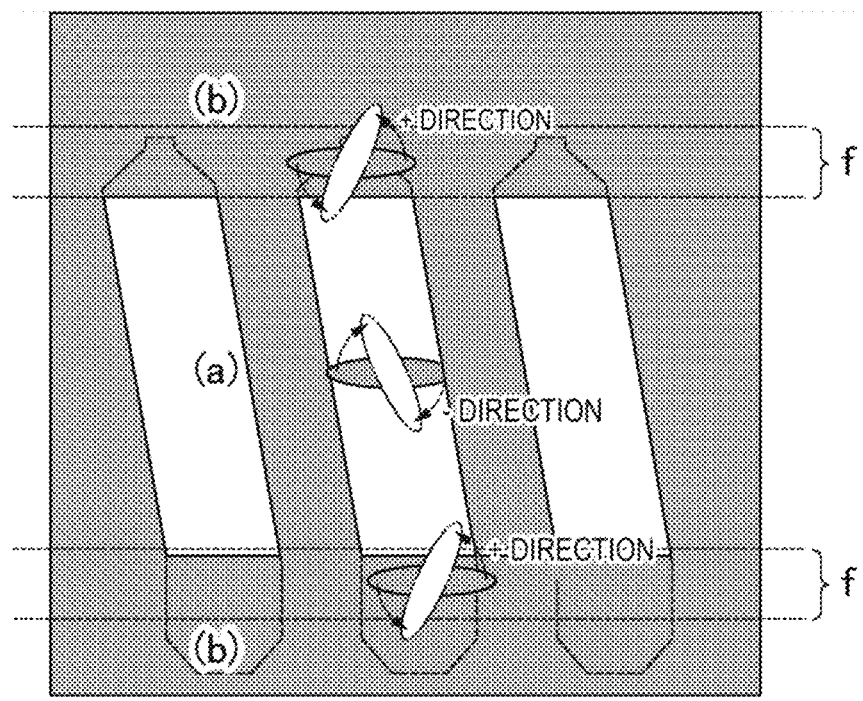
FIG. 23 is a diagram in which a conceptual diagram illustrating the rotation direction of the liquid crystal molecule 21 is superimposed on FIG. 19.

For reference, FIG. 22 and FIG. 23 are provided as diagrams each conceptually illustrating that the rotation direction of the liquid crystal molecule 21 (that is, the liquid crystal molecule 21A on the TFT substrate side) when a voltage is applied is different between the pixel center portion (a) and the pixel end portion (b). FIG. 22 is a diagram in which the conceptual diagram (that is, FIG. 21) illustrating the rotation direction of the liquid crystal molecules 21 is superimposed on FIG. 18, and FIG. 23 is a diagram in which the conceptual diagram (that is, FIG. 21) illustrating the rotation direction of the liquid crystal molecules 21 is superimposed on FIG. 19.

Test Examples 1 and 2

Figure 17B:
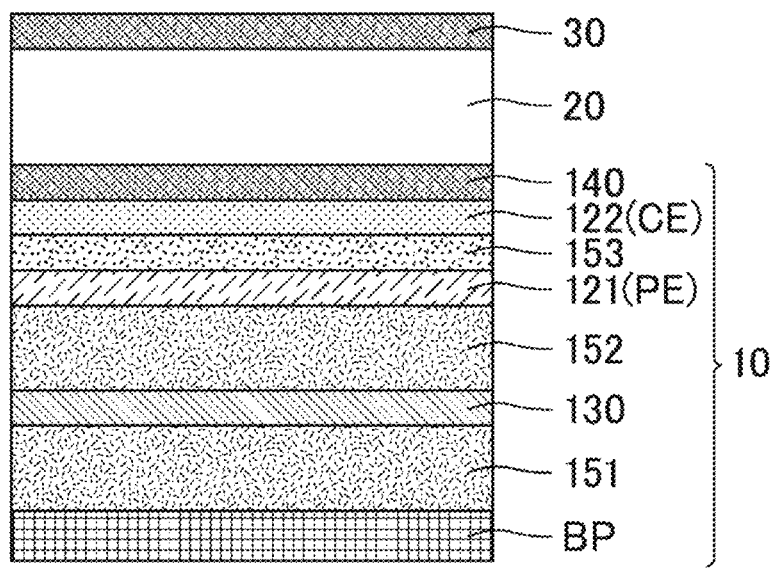
FIG. 17B is a schematic cross-sectional view illustrating a device assumed in Test Examples 1 and 2.

When the reflective liquid crystal display device 1 using a negative-working liquid crystal material is assumed, the occurrences of alignment disorder due to the presence or absence of the kink portion were compared by three dimensional optical simulation. Specifically, as illustrated in FIG. 17B, the pixel electrode PE and the common electrode CE for applying a voltage to the liquid crystal layer 20 are disposed on the TFT substrate (first substrate) 10 side, and the common electrode CE serving as the upper layer electrode (second electrode 122) is a slit electrode including a plurality of belt-shaped portions SP and a slit Sl located between the two belt-shaped portions SP adjacent to each other. The width L of each belt-shaped portion SP was 2.4 μm, and the width of each slit Sl was 2.2 μm. A negative-working liquid crystal material was used for the liquid crystal layer 20. The pixel electrode PE serving as the lower layer electrode (first electrode 121) was a solid electrode. FIG. 17B is a schematic cross-sectional view of the device assumed in the present example.

Here, in Test Example 1, the plurality of belt-shaped portions SP configuring the slit electrode (common electrode CE) had linear shapes extending substantially parallel to each other and in the same direction, but had bending parts f at end portions thereof (see FIG. 24A(b)). On the other hand, Test Example 2 had linear shapes extending substantially parallel to each other and in the same direction, and did not include the bending parts f (see FIG. 24B(b)). FIG. 24A is a table of a simulation result of Test Example 1 (see (a)) and a diagram conceptually illustrating the plurality of belt-shaped portions SP based on a result thereof (see (b)). FIG. 24B is a table of a simulation result of Test Example 2 (see (a)) and a diagram conceptually illustrating the plurality of belt-shaped portions SP based on a result thereof (see (b)).

As a result obtained by evaluating the reflectivity distribution by a three dimensional optical simulation, the result of Test Example 1 is provided in FIG. 24A(a), and the result of Test Example 2 is provided in FIG. 24B(a). In Test Example 1, the alignment disorder occurs in the bending part f called a kink portion, and the luminance of the kink portion f is low (see FIG. 24A(a)). On the other hand, in Test Example 2, the alignment disorder did not occur, and the luminance at the end portions of the common electrode CE (portion corresponding to the kink portion f of Test Example 1) was higher than that in Test Example 1 (see FIG. 24B(a)). Therefore, it was confirmed that when the plurality of belt-shaped portions SP configuring the slit electrode were formed in a linear shape extending substantially parallel to each other and in the same direction and including no bending part, the alignment disorder did not occur. It is considered that the relationship between the alignment of the liquid crystal molecule 21 and the slit angle was uniform in each pixel, and as a result, the alignment disorder did not occur.

Test Examples 3 and 4

Thus, it is considered that the cause of the occurrence of the alignment disorder is a difference in the slit angle of the slit electrode between the kink portion and the rest of the portion. Therefore, a change in the reflection mode efficiency depending on the slit angle was evaluated and analyzed by a three dimensional optical simulation. Specifically, in the liquid crystal display device 1 having a configuration including the reflective liquid crystal panel 1X, the phase difference layer 40, and the polarizer 50 in this order, a structure in which the λ/4 plate 41 and the λ/2 plate 42 were disposed as the phase difference layer 40, in order from the liquid crystal panel 1X side, was assumed (see FIG. 9). A uniaxial phase difference plate having a retardation of 110 nm is used as the λ/4 plate 41, and a uniaxial phase difference plate having a retardation of 260 nm is used as the λ/2 plate 42.

Figure 25:
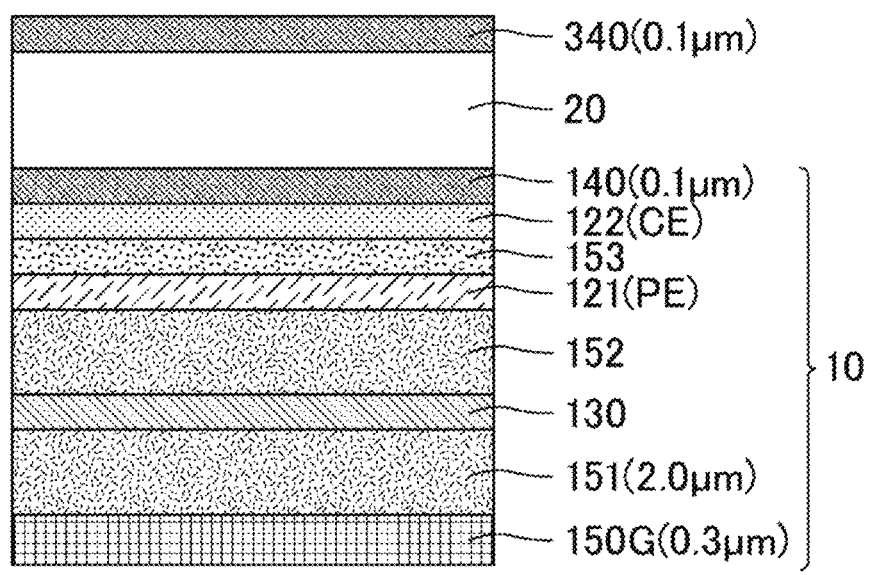
FIG. 25 is a schematic cross-sectional view illustrating a liquid crystal panel 1X included in a device assumed in Test Examples 3 and 4.
Figure 26:
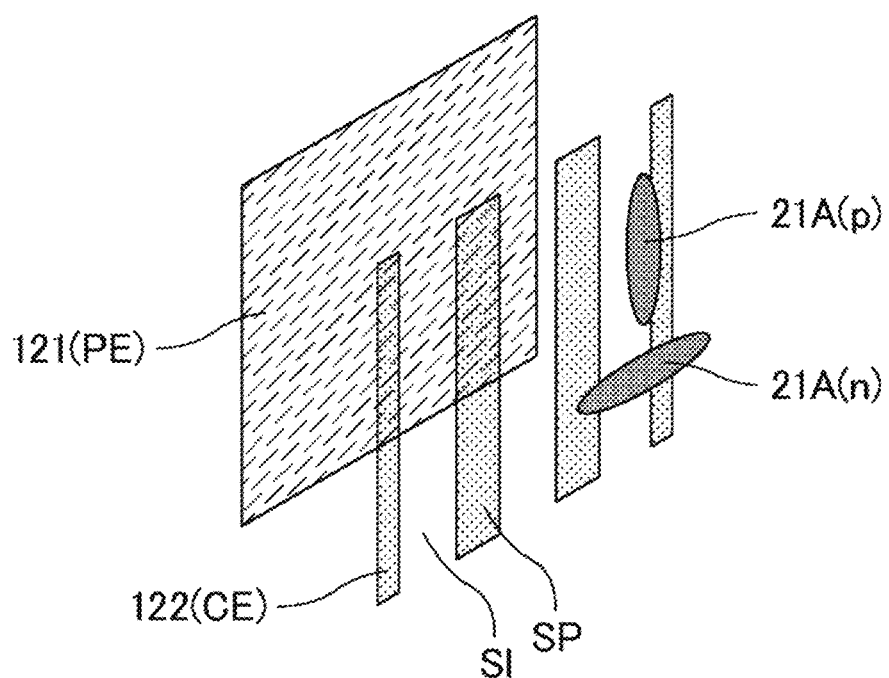
FIG. 26 is a schematic view conceptually illustrating an electrode structure of the pixel electrode PE and the common electrode CE.

As the liquid crystal panel 1X, the pixel electrode PE and the common electrode CE for applying a voltage to the liquid crystal layer 20 are disposed on the TFT substrate (first substrate) 10 side, and the common electrode CE serving as the upper layer electrode (second electrode 122) is a slit electrode including the plurality of belt-shaped portions SP and a slit Sl located between two belt-shaped portions SP adjacent to each other (see FIGS. 25 and 26). The plurality of belt-shaped portions SP were formed of linear shapes extending substantially parallel to each other and in the same direction, and did not include bending parts, and the slit angle was set to 0° (see FIG. 26). The pixel electrode PE serving as the lower layer electrode (first electrode 121) was a solid electrode. A liquid crystal layer having a monodomain structure (liquid crystal layer that performed normally black display) was assumed. In FIG. 25, the film thicknesses of some of the layers are described in parentheses after the reference numerals representing the layers.

An example in which a positive-working liquid crystal material was used for the liquid crystal layer 20 was Test Example 3, and an example in which a negative-working liquid crystal material was used for the liquid crystal layer 20 was Test Example 4. A ratio of the width L of each belt-shaped portion SP to the width S of each slit Sl (referred to as L/S condition) was L/S (μm)=2.2/4.1 in Test Examples 3-1 and 4-1, L/S (μm)=1.6/3.0 in Test Examples 3-2 and 4-2, and L/S (μm)=3.0/5.0 in Test Examples 3-3 and 4-3.

FIG. 25 is a schematic cross-sectional view of the liquid crystal panel 1X included in the device assumed in the present example. FIG. 26 is a schematic view conceptually illustrating an electrode structure of the pixel electrode PE and the common electrode CE, and particularly illustrates examples (Test example 3-2 and Test example 4-2) in which L/S (μm)=1.6/3.0. In FIG. 26, the alignment (that is, the initial alignment) of the liquid crystal molecule 21A on the TFT substrate 10 side when no voltage is applied is represented by the orientations of a positive-working liquid crystal molecule 21A (p) and negative-working liquid crystal molecule 21A (n).

In an actual simulation, in order to simplify a condition setting, a pre-twist angle of the liquid crystal molecule 21 and an axis angle of the optical film were changed instead of changing the slit angle. However, the twist angle θ1 was fixed (74° in Test Examples 3 and 4). Specifically, the pre-twist angle of the liquid crystal molecule 21 and the axis angle of each optical film are rotated by the same angle as the slit angle, on the basis of an axial setting of the optical film described below. The optical film means the polarizer 50 and the phase difference layer 40 (in the presents example, the λ/4 plate 41 and the λ/2 plate 42). Note that the pre-twist angle of the liquid crystal molecule 21 is the initial alignment angle of the liquid crystal molecule 21A on the TFT substrate (first substrate) 10 side, with respect to a reference (3 o'clock direction of the liquid crystal panel in a plan view from the observation face side is defined herein as a reference) 0°.

Figure 27:
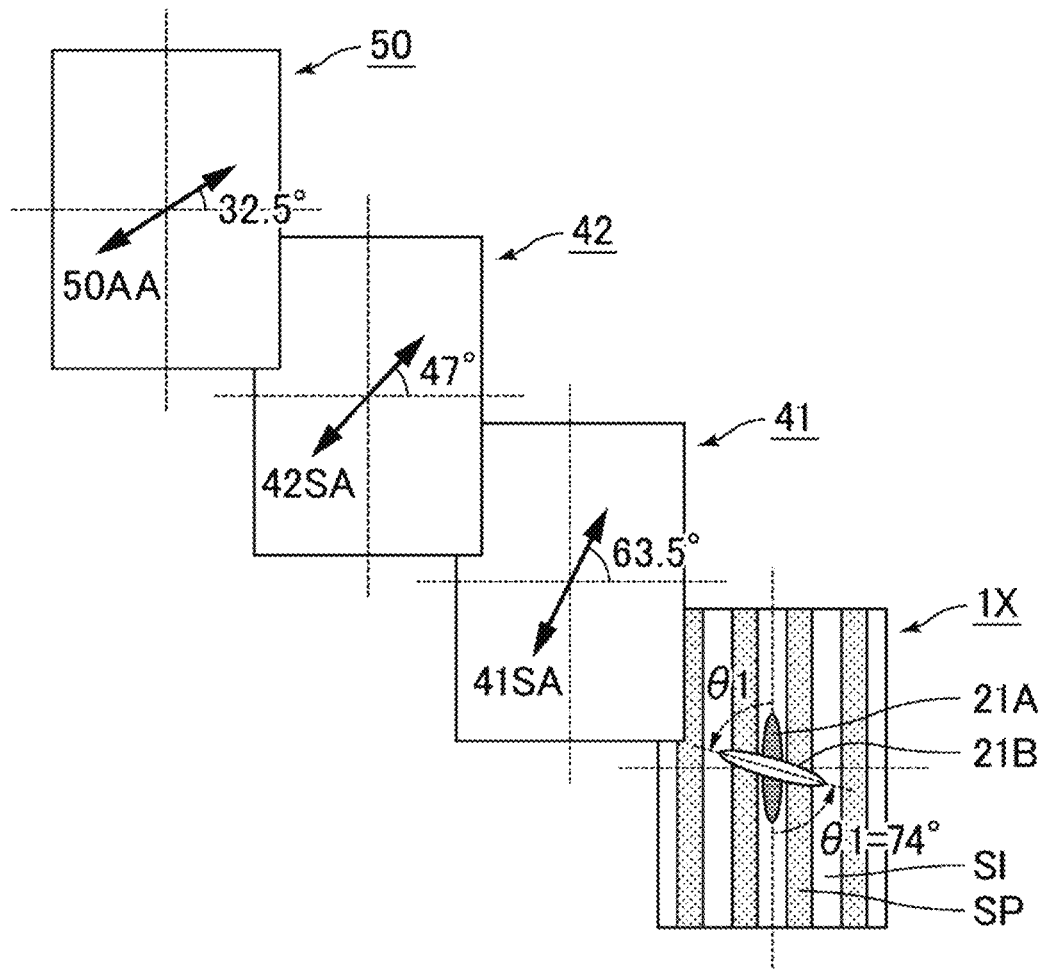
FIG. 27 is a plan view conceptually illustrating an axial setting of each optical film used in the Test Example 3.
Figure 28:
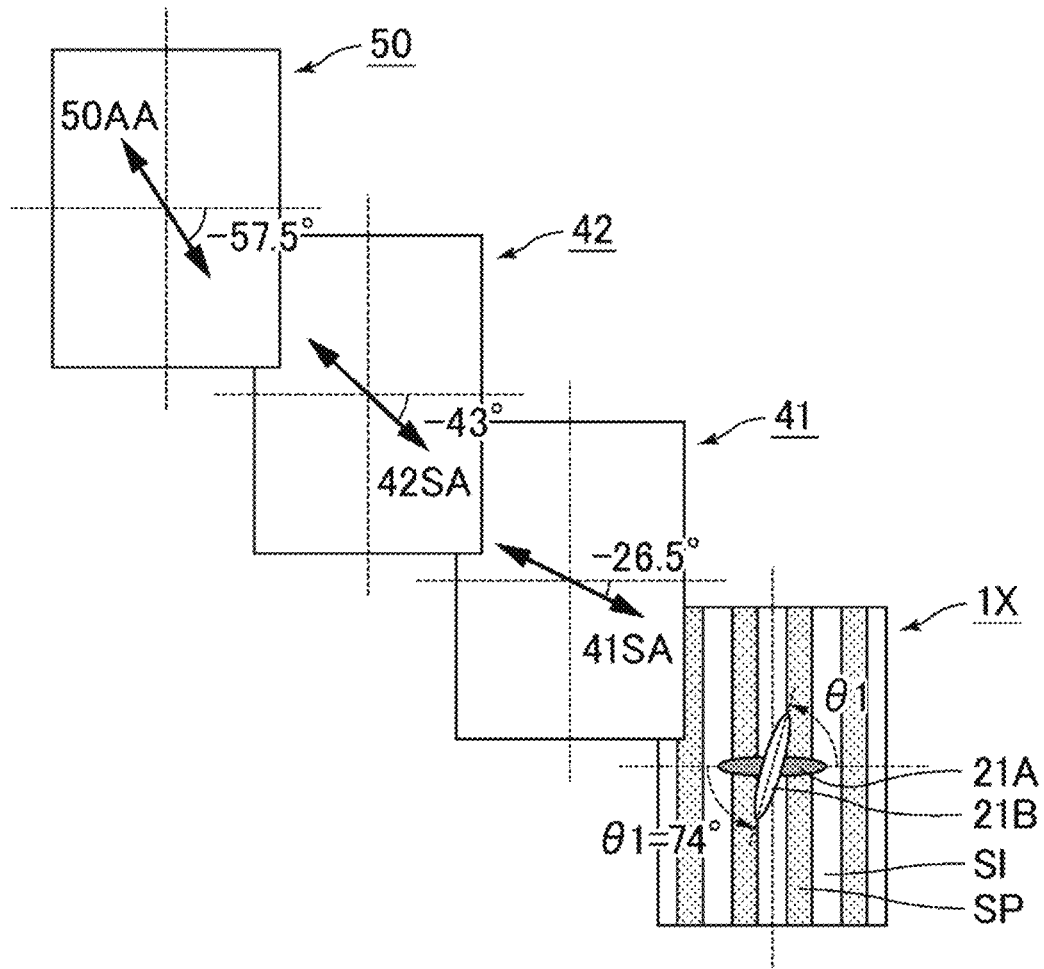
FIG. 28 is a plan view conceptually illustrating an axial setting of each optical film used in Test Example 4.

The axial setting of each optical film and the retardation dΔn of the liquid crystal layer 20 were as illustrated in FIG. 27 and Table 1 in Test Example 3 (positive-working liquid crystal), and as illustrated in FIG. 28 and Table 1 in Test Example 4 (negative-working liquid crystal). FIG. 27 is a plan view conceptually illustrating the axial setting of each optical film used in Test Example 3, and FIG. 28 is a plan view conceptually illustrating the axial setting of each optical film used in Test Example 4. In FIG. 27 and FIG. 28, each optical film is regarded as a dial of a timepiece where the 3 o'clock direction is defined as 0° and the counter-clockwise direction is defined as positive. The axis angle of each optical film is an angle obtained when observed in a plan view from the observation face side.

Figure 29:
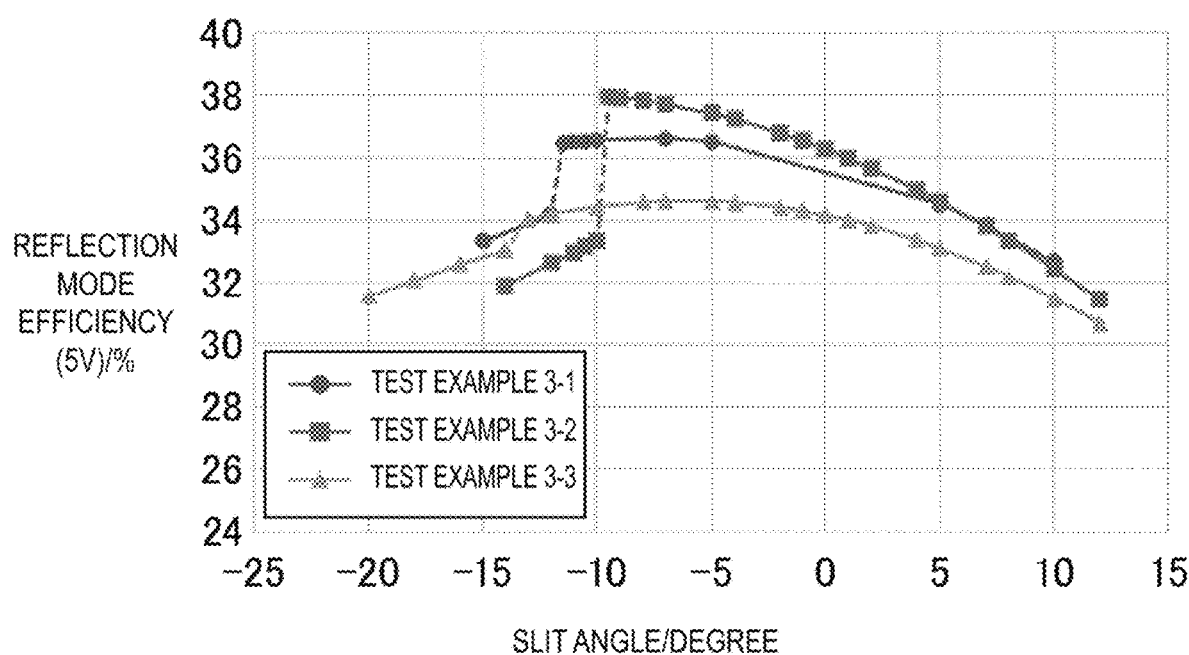
FIG. 29 is a graph showing a result of the Test Example 3.
Figure 30:
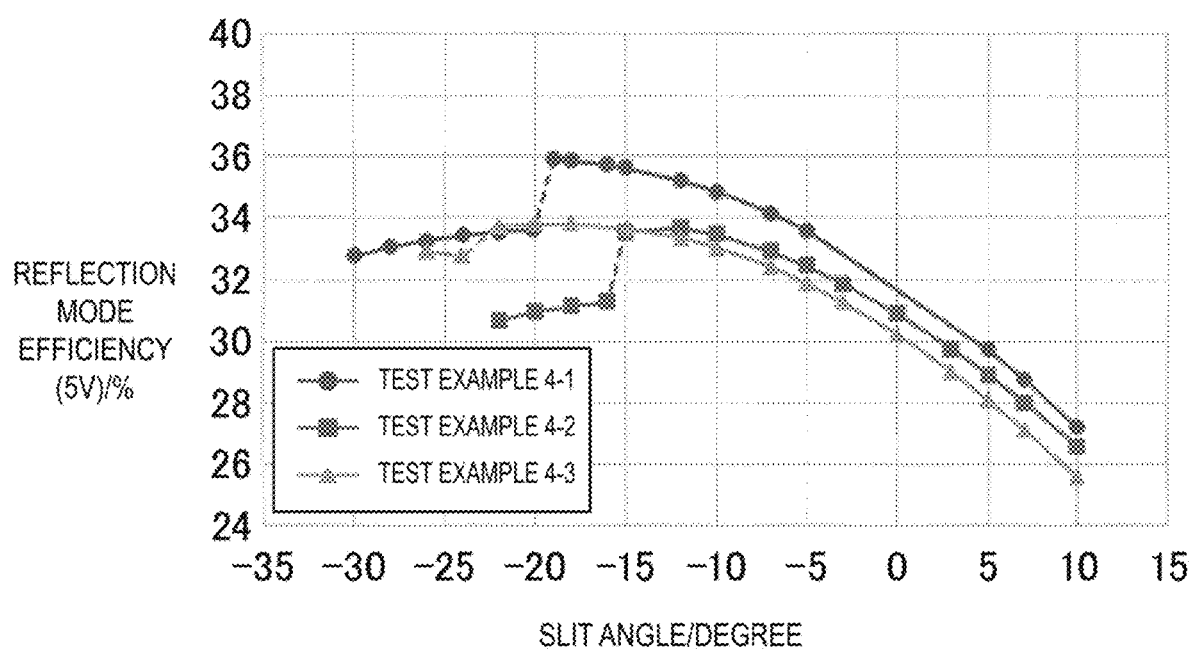
FIG. 30 is a graph showing a result of the Test Example 4.

Voltage settings were set from 0V to 6V in 0.5V increments. Average reflection mode efficiencies of the brightness distributions were obtained, and reflection mode efficiencies at the time of 5V application were plotted for each L/S condition. Here, a reflection mode efficiency was determined by the following formula: Reflection mode efficiency (%)= (luminance with polarizer)/(luminance without polarizer)× 100. Results are provided in FIG. 29 and FIG. 30. FIG. 29 is a graph showing the results of Test Example 3 (positive-working, the twist angle 74°), and FIG. 30 is a graph showing the results of Test Example 4 (negative-working, the twist angle 74°).

TABLE 1

| $\theta_1 = 74°$ | | Test Example 3 | Test Example 4 |
|---|---|---|---|
| Liquid crystal material | | Positive-working | Negative-working |
| Polarizer | Absorption axis | 32.5° | −57.5° |
| λ/2 plate | Slow axis | 47.0° | −43.0° |
| λ/4 plate | Slow axis | 63.5° | −26.5° |
| Retardation dΔn | | 215 nm | 215 nm |

In FIG. 29 (the positive-working, the twist angle 74°), it is confirmed that the reflectivity greatly changes after a specific slit angle. This may stem from the fact that the rotation direction of the liquid crystal molecule when a voltage is applied is different. It is also confirmed that a slit angle at which the reflectivity is discontinuous changes depending on the L/S condition. The slit angle at which the reflectivity is discontinuous is around −11.5° in Test Example 3-1 (L/S (μm)=2.2/4.1), around −9.5° in Test Example 3-2 (L/S (μm)=1.6/3.0), and around −13° in Test Example 3-3 (L/S (μm)=3.0/5.0). Therefore, in each L/S condition, a slit angle in a case where a reflection mode efficiency is 30% or greater, a slit angle in a case where the reflection mode efficiency is 33% or greater, and a slit angle in a case where the reflection mode efficiency is 36% or greater are set to the above-described preferable range, more preferable range, and still more preferable range, respectively.

Similarly, in FIG. 30 (the negative-working, the twist angle 74°), it is confirmed that the reflectivity largely changes after a specific slit angle, and it is also confirmed that the slit angle at which the reflectivity is discontinuous changes depending on the L/S condition. The slit angle at which the reflectivity is discontinuous is around −19° in Test Example 4-1 (L/S (μm)=2.2/4.1), around −15° in Test Example 4-2 (L/S (μm)=1.6/3.0), and around −22° in Test Example 4-3 (L/S (μm)=3.0/5.0). Therefore, in each L/S condition, a slit angle in a case where the reflection mode efficiency is 30% or greater and a slit angle in a case where the reflection mode efficiency is 33% or greater are set to the above-described preferable range and more preferable range, respectively.

Test Examples 5 and 6

Figure 31:
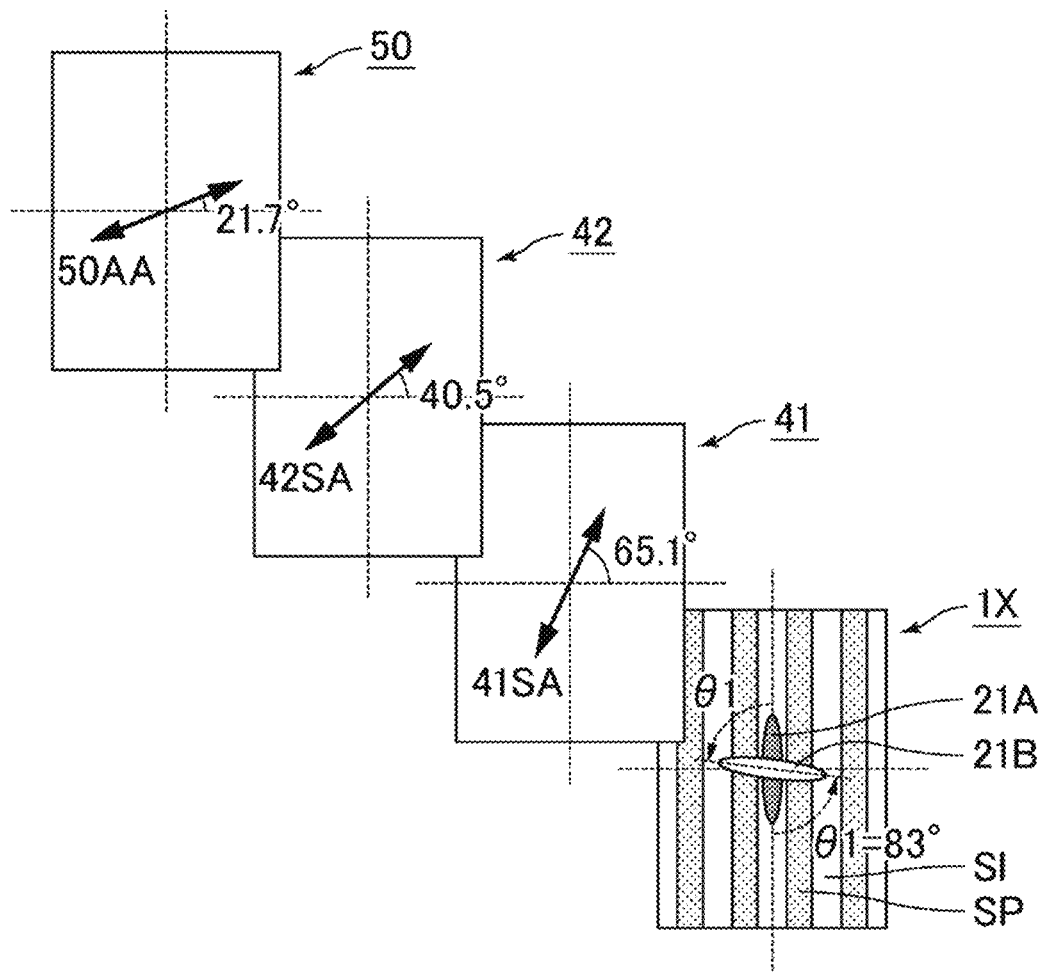
FIG. 31 is a plan view conceptually illustrating an axial setting of each optical film used in Test Example 5.
Figure 32:
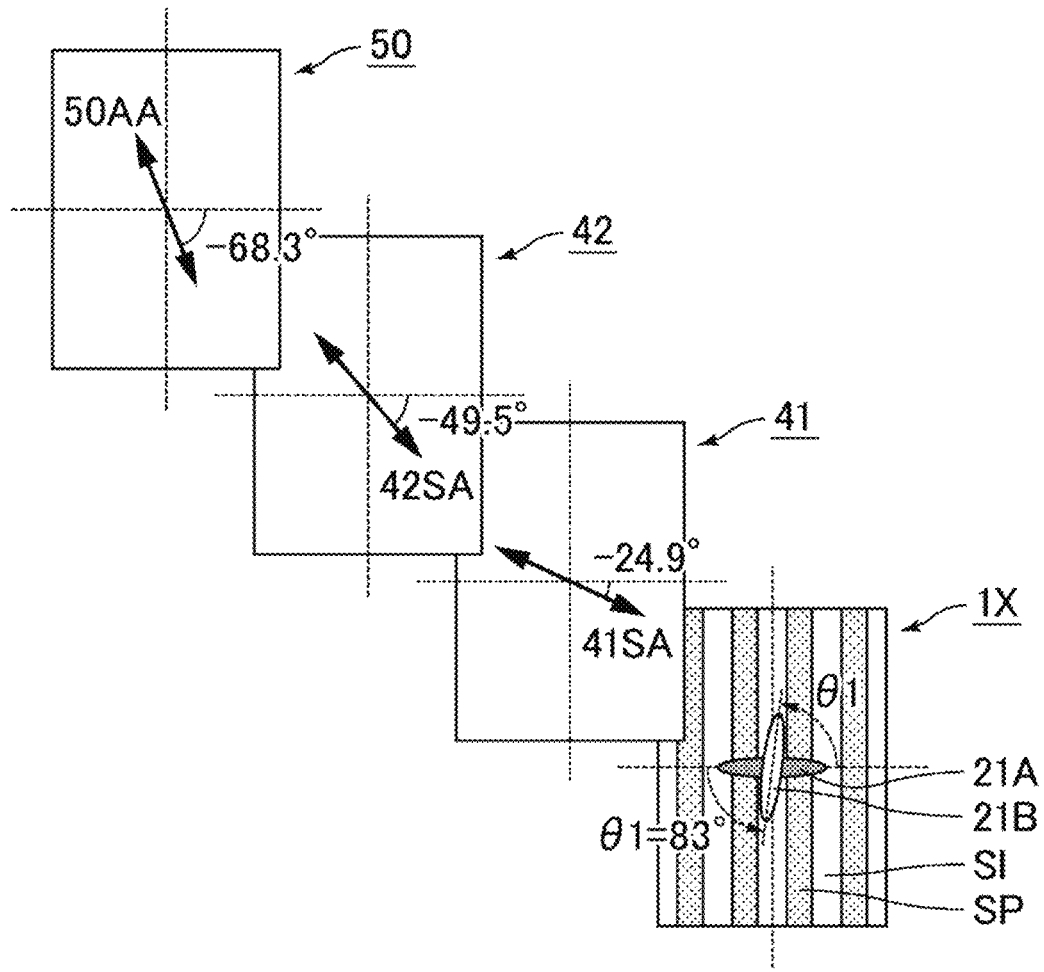
FIG. 32 is a plan view conceptually illustrating an axial setting of each optical film used in Test Example 6.

Test Example 5 is an example set to substantially the same conditions as those of Test Example 3 except that the twist angle $\theta_1$ was 83° and the axial setting of each optical film and the retardation dΔn of the liquid crystal layer 20 were as illustrated in FIG. 31 and Table 2. Test Example 6 is an example set to substantially the same conditions as those of Test Example 4 except that the twist angle $\theta_1$ was 83° and the axial setting of each optical film and the retardation dΔn of the liquid crystal layer 20 were as illustrated in FIG. 32 and Table 2. The L/S condition was L/S (μm)=2.2/4.1 in Test Example 5-1 and Test Example 6-1, L/S (μm)=1.6/3.0 in Test Example 5-2 and Test Example 6-2, and L/S (μm)=3.0/5.0 in Test Example 5-3 and Test Example 6-3. FIG. 31 is a plan view conceptually illustrating an axial setting of each optical film used in Test Example 5, and FIG. 32 is a plan view conceptually illustrating an axial setting of each optical film used in Test Example 6.

Figure 33:
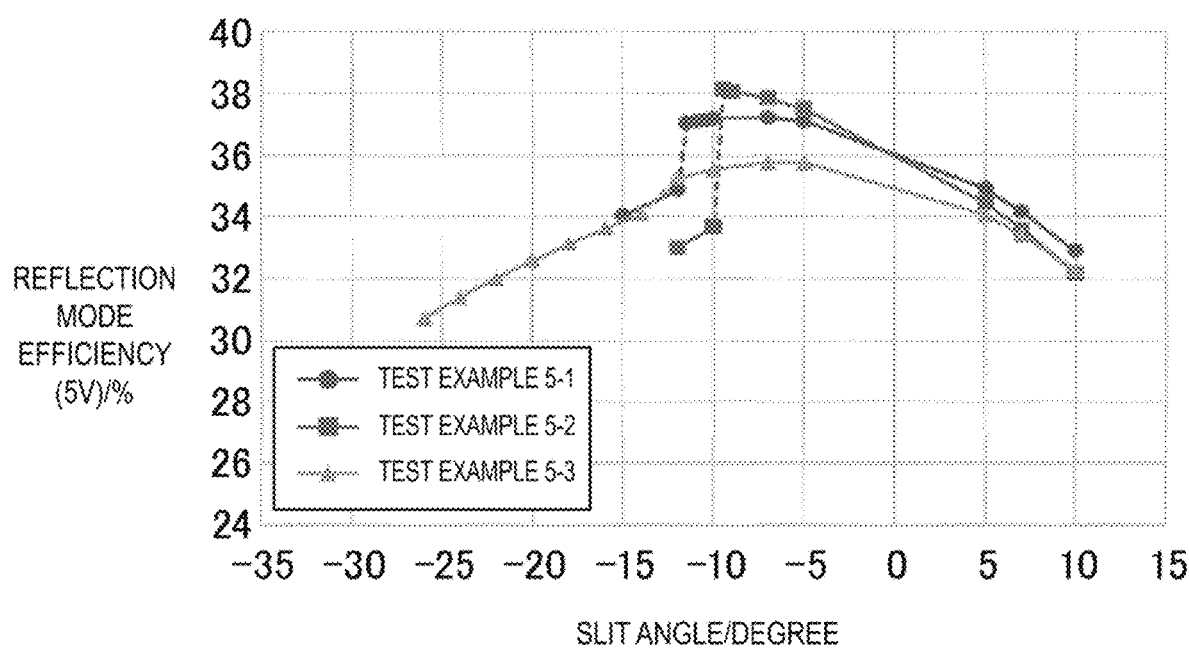
FIG. 33 is a graph showing a result of the Test Example 5.
Figure 34:
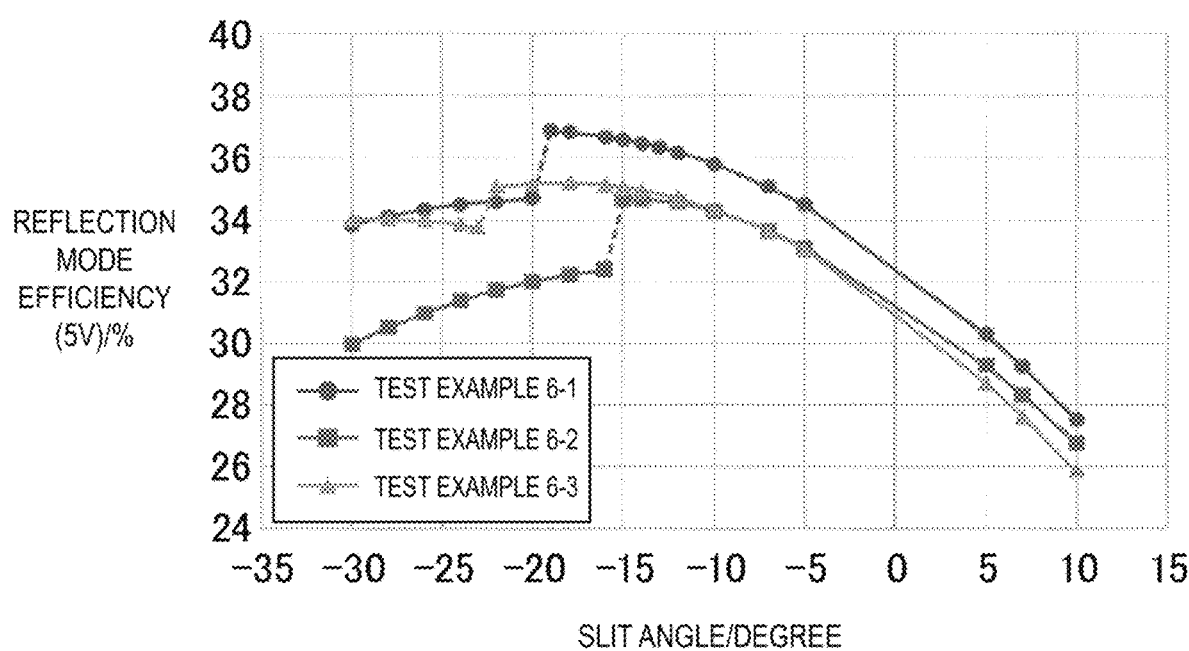
FIG. 34 is a graph showing a result of the Test Example 6.

Voltage settings were set from 0V to 6V in 0.5V increments. Average reflection mode efficiencies of the brightness distributions were obtained, and reflection mode efficiencies at the time of 5V application were plotted for each L/S condition. Results are illustrated in FIG. 33 and FIG. 34. FIG. 33 is a graph showing results of Test Example 5 (positive-working, the twist angle 83°), and FIG. 34 is a graph showing results of Test Example 6 (negative-working, the twist angle 83°).

TABLE 2

| $\theta_1 = 83°$ | | Test Example 5 | Test Example 6 |
|---|---|---|---|
| Liquid crystal material | | Positive-working | Negative-working |
| Polarizer | Absorption axis | 21.7° | −68.3° |
| λ/2 plate | Slow axis | 40.5° | −49.5° |
| λ/4 plate | Slow axis | 65.1° | −24.9° |
| | Retardation dΔn | 245 nm | 245 nm |

Also in FIG. 33 (positive-working, the twist angle 83°), it is confirmed that the reflectivity greatly changes after a specific slit angle, and it is also confirmed that the slit angle at which the reflectivity is discontinuous changes depending on the L/S condition. The slit angle at which the reflectivity is discontinuous is around −11.5° in Test Example 5-1 (L/S (μm)=2.2/4.1), around −9.5° in Test Example 5-2 (L/S (μm)=1.6/3.0), and around −13° in Test Example 5-3 (L/S (μm)=3.0/5.0). Therefore, in each L/S condition, a slit angle in a case where a reflection mode efficiency is 30% or greater, a slit angle in a case where the reflection mode efficiency is 33% or greater, and a slit angle in a case where the reflection mode efficiency is 36% or greater are set to the above-described preferable range, more preferable range, and still more preferable range, respectively.

Similarly, in FIG. 34 (negative-working, the twist angle 83°), it is confirmed that the reflectivity greatly changes after a specific slit angle, and it is also confirmed that the slit angle at which the reflectivity is discontinuous changes depending on the L/S condition. The slit angle at which the reflectivity is discontinuous is around −19° in Test Example 6-1 (L/S (μm)=2.2/4.1), around −15° in Test Example 6-2 (L/S (μm) =1.6/3.0), and around −22° in Test Example 6-3 (L/S (μm) =3.0/5.0). Therefore, in each L/S condition, a slit angle in a case where a reflection mode efficiency is 30% or greater, a slit angle in a case where the reflection mode efficiency is 33% or greater, and a slit angle in a case where the reflection mode efficiency is 36% or greater are set to the above-described preferable range, more preferable range, and still more preferable range, respectively.

Each aspect of the disclosure described above may be combined as appropriate without departing from the gist of the disclosure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device including a plurality of pixels arrayed in a matrix shape, the liquid crystal display device comprising:
   a first substrate;
   a second substrate facing the first substrate;
   a liquid crystal layer provided between the first substrate and the second substrate and including a positive-working liquid crystal material;
   a polarizer disposed outside the first substrate or the second substrate; and
   a phase difference layer disposed between the first substrate and the polarizer or between the second substrate and the polarizer,
   wherein the first substrate includes a reflective layer that reflects light, a first electrode and a second electrode configured to generate a transverse electrical field in the liquid crystal layer, and a first horizontal alignment film in contact with the liquid crystal layer,
   at least one of the first electrode and the second electrode includes a plurality of belt-shaped portions and a slit located between two adjacent belt-shaped portions of the plurality of belt-shaped portions,
   in each pixel of the plurality of pixels, the plurality of belt-shaped portions has a linear shape extending substantially parallel to each other and in a same direction, and does not include a bending part,
   the second substrate includes a second horizontal alignment film in contact with the liquid crystal layer,
   the liquid crystal layer has a twist angle of 58.3° or greater and 89.9° or less when no voltage is applied and has a single domain alignment,
   an alignment direction of liquid crystal molecules on a side of the first substrate is −30° or greater and 30° or less when no voltage is applied and when a direction in which the plurality of belt-shaped portions extends is used as a reference 0°,
   the plurality of belt-shaped portions has a ratio L/S of a width L per belt-shaped portion in a plan view to a width S per slit in the plan view, and the ratio L/S is 0.4 to 0.7, the polarizer comprises an absorption-type polarizer, and
a light absorption axis of the polarizer is 5° or greater and 35° or less when a direction orthogonal to the direction in which the plurality of belt-shaped portions extends is used as the reference 0°.

2. The liquid crystal display device according to claim 1, wherein the plurality of belt-shaped portions does not include a notched portion.

3. The liquid crystal display device according to claim 1, wherein the direction in which the plurality of belt-shaped portions extends is the same direction at least in adjacent pixels of the plurality of pixels or in a display region.

4. The liquid crystal display device according to claim 1, wherein the liquid crystal display device displays in a normally black mode.

5. The liquid crystal display device according to claim 1, wherein one of the first electrode and the second electrode is a pixel electrode provided in each of the plurality of pixels and the other one of the first electrode and the second electrode is a common electrode including a plurality of segments, each configured to function as a touch sensor electrode, and
the first substrate further includes a plurality of touch wiring lines, each connected to a corresponding one of the touch sensor electrodes.

6. The liquid crystal display device according to claim 1, further comprising a light source.

7. The liquid crystal display device according to claim 1, wherein each pixel has a reflective region in which the reflective layer is disposed and a transmissive region in which the reflective layer is not disposed, and the plurality of belt-shaped portions in the reflective region and the plurality of belt-shaped portions in the transmissive region extend substantially parallel to each other and in a same direction.

8. A liquid crystal display device including a plurality of pixels arrayed in a matrix shape, the liquid crystal display device comprising:
a first substrate;
a second substrate facing the first substrate;
a liquid crystal layer provided between the first substrate and the second substrate;
a polarizer disposed outside the first substrate or the second substrate; and
a phase difference layer disposed between the first substrate and the polarizer or between the second substrate and the polarizer,
wherein the first substrate includes a reflective layer that reflects light, a first electrode and a second electrode configured to generate a transverse electrical field in the liquid crystal layer, and a first horizontal alignment film in contact with the liquid crystal layer,
at least one of the first electrode and the second electrode includes a plurality of belt-shaped portions and a slit located between two adjacent belt-shaped portions of the plurality of belt-shaped portions,
in each pixel of the plurality of pixels, the plurality of belt-shaped portions has a linear shape extending substantially parallel to each other and in a same direction, and does not include a bending part,
the second substrate includes a second horizontal alignment film in contact with the liquid crystal layer,
the liquid crystal layer takes a twist alignment when no voltage is applied,
the liquid crystal layer includes a positive-working liquid crystal material,
the phase difference layer includes a λ/2 plate, and
an in-plane slow axis of the λ/2 plate is 25° or greater and 50° or less when a direction orthogonal to a direction in which the plurality of belt-shaped portions extends is used as a reference 0°.

9. The liquid crystal display device according to claim 8, wherein the plurality of belt-shaped portions does not include a notched portion.

10. The liquid crystal display device according to claim 8, wherein the direction in which the plurality of belt-shaped portions extends is the same direction at least in adjacent pixels of the plurality of pixels or in a display region.

11. The liquid crystal display device according to claim 8, wherein the liquid crystal display device displays in a normally black mode.

12. The liquid crystal display device according to claim 8, wherein one of the first electrode and the second electrode is a pixel electrode provided in each of the plurality of pixels and the other one of the first electrode and the second electrode is a common electrode including a plurality of segments, each configured to function as a touch sensor electrode, and
the first substrate further includes a plurality of touch wiring lines, each connected to a corresponding one of the touch sensor electrodes.

13. A liquid crystal display device including a plurality of pixels arrayed in a matrix shape, the liquid crystal display device comprising:
a first substrate;
a second substrate facing the first substrate;
a liquid crystal layer provided between the first substrate and the second substrate;
a polarizer disposed outside the first substrate or the second substrate; and
a phase difference layer disposed between the first substrate and the polarizer or between the second substrate and the polarizer,
wherein the first substrate includes a reflective layer that reflects light, a first electrode and a second electrode configured to generate a transverse electrical field in the liquid crystal layer, and a first horizontal alignment film in contact with the liquid crystal layer,
at least one of the first electrode and the second electrode includes a plurality of belt-shaped portions and a slit located between two adjacent belt-shaped portions of the plurality of belt-shaped portions,
in each pixel of the plurality of pixels, the plurality of belt-shaped portions has a linear shape extending substantially parallel to each other and in a same direction, and does not include a bending part,
the second substrate includes a second horizontal alignment film in contact with the liquid crystal layer,
the liquid crystal layer takes a twist alignment when no voltage is applied,
the liquid crystal layer includes a positive-working liquid crystal material,
the phase difference layer includes a λ/4 plate, and
an in-plane slow axis of the λ/4 plate is 45° or greater and 70° or less when a direction orthogonal to a direction in which the plurality of belt-shaped portions extends is used as a reference 0°.

14. The liquid crystal display device according to claim 13,
wherein the plurality of belt-shaped portions does not include a notched portion.

15. The liquid crystal display device according to claim 13,
- wherein the direction in which the plurality of belt-shaped portions extends is the same direction at least in adjacent pixels of the plurality of pixels or in a display region.

16. The liquid crystal display device according to claim 13,
- wherein the liquid crystal display device displays in a normally black mode.

17. The liquid crystal display device according to claim 13,
- wherein one of the first electrode and the second electrode is a pixel electrode provided in each of the plurality of pixels and the other one of the first electrode and the second electrode is a common electrode including a plurality of segments, each configured to function as a touch sensor electrode, and
- the first substrate further includes a plurality of touch wiring lines, each connected to a corresponding one of the touch sensor electrodes.

* * * * *